United States Patent
Ishii

(10) Patent No.: US 9,949,081 B2
(45) Date of Patent: Apr. 17, 2018

(54) ADVANCE NOTIFICATION SYSTEM, ADVANCE NOTIFICATION METHOD, AND MOBILE COMMUNICATION DEVICE

(71) Applicant: KYOCERA CORPORATION, Kyoto-shi, Kyoto (JP)

(72) Inventor: Atsushi Ishii, Osaka (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/242,354

(22) Filed: Aug. 19, 2016

(65) Prior Publication Data
US 2016/0360366 A1 Dec. 8, 2016

Related U.S. Application Data

(63) Continuation-in-part of application No. PCT/JP2015/054854, filed on Feb. 20, 2015.

(30) Foreign Application Priority Data

Feb. 21, 2014 (JP) .................... 2014-031823

(51) Int. Cl.
*H04W 4/02* (2009.01)
*H04L 29/08* (2006.01)
(Continued)

(52) U.S. Cl.
CPC ............ *H04W 4/023* (2013.01); *G01C 21/00* (2013.01); *G08B 21/0269* (2013.01);
(Continued)

(58) Field of Classification Search
CPC ....... H04W 4/023; H04W 4/185; H04W 4/12; H04W 88/02; H04L 67/32; H04L 67/26;
(Continued)

(56) References Cited

U.S. PATENT DOCUMENTS 7,460,883 B1 * 12/2008 McBrearty ........ H04M 1/72588
455/414.1
8,902,714 B2 * 12/2014 Gossweiler, III ...... G04G 21/08
368/10
(Continued)

FOREIGN PATENT DOCUMENTS

JP 6-202992 A 7/1994
JP H10-124464 A 5/1998
(Continued)

OTHER PUBLICATIONS

International Search Report dated Mar. 17, 2015 issued by the Japanese Patent Office for International Application No. PCT/JP2015/054854.
(Continued)

*Primary Examiner* — Brandon J Miller
(74) *Attorney, Agent, or Firm* — Procopio Cory Hargreaves and Savitch LLP

(57) ABSTRACT

An advance notification system, an advance notification method, and a mobile communication device are disclosed. In one embodiment, an advance notification system comprises a first mobile device and a second mobile device. The first mobile device stores a schedule including a scheduled time and a scheduled place and comprises a transmitter and at least one first processor. The second mobile device acquires a device position of the second mobile device itself. The at least one processor determines whether an advance notification is required on the basis of the device position and the scheduled place. The at least one processor also causes the transmitter to transmit the advance notification to the second mobile device when determining that the advance notification is required.

6 Claims, 23 Drawing Sheets

(51) Int. Cl.
*H04W 4/18* (2009.01)
*H04W 4/12* (2009.01)
*H04L 29/06* (2006.01)
*G01C 21/00* (2006.01)
*G08B 21/02* (2006.01)
*H04W 88/02* (2009.01)
*G08B 15/00* (2006.01)

(52) U.S. Cl.
CPC ..... *G08B 21/0283* (2013.01); *G08B 21/0288* (2013.01); *H04L 67/18* (2013.01); *H04L 67/26* (2013.01); *H04L 67/32* (2013.01); *H04L 67/42* (2013.01); *H04W 4/12* (2013.01); *H04W 4/185* (2013.01); *G08B 15/004* (2013.01); *H04W 88/02* (2013.01)

(58) Field of Classification Search
CPC ..... H04L 67/42; G01C 21/00; G08B 21/0288; G08B 21/0283; G08B 21/0269; G08B 15/004
See application file for complete search history.

(56) References Cited

U.S. PATENT DOCUMENTS

| | | | | |
|---|---|---|---|---|
| 2006/0208878 A1* | 9/2006 | Nowlan | ............ | G08B 21/0258 340/539.13 |
| 2011/0130958 A1* | 6/2011 | Stahl | .................... | G01C 21/362 701/533 |
| 2011/0255379 A1* | 10/2011 | Vidal | .................... | G04G 9/047 368/70 |
| 2014/0180582 A1* | 6/2014 | Pontarelli | ................ | G08B 6/00 701/494 |
| 2014/0222328 A1* | 8/2014 | Baca | ....................... | H04W 4/02 701/410 |
| 2015/0285643 A1* | 10/2015 | Tucker | ................... | G06Q 50/01 701/519 |

FOREIGN PATENT DOCUMENTS

| | | |
|---|---|---|
| JP | 2010-081338 A | 4/2010 |
| JP | 2011-142582 A | 7/2011 |

OTHER PUBLICATIONS

Written Opinion of the International Searching Authority dated Mar. 17, 2015 issued by the Japanese Patent Office for International Application No. PCT/JP2015/054854.

Office Action dated Sep. 5, 2017 issued in counterpart Japanese Application No. 2014-031823.

* cited by examiner

F I G. 14
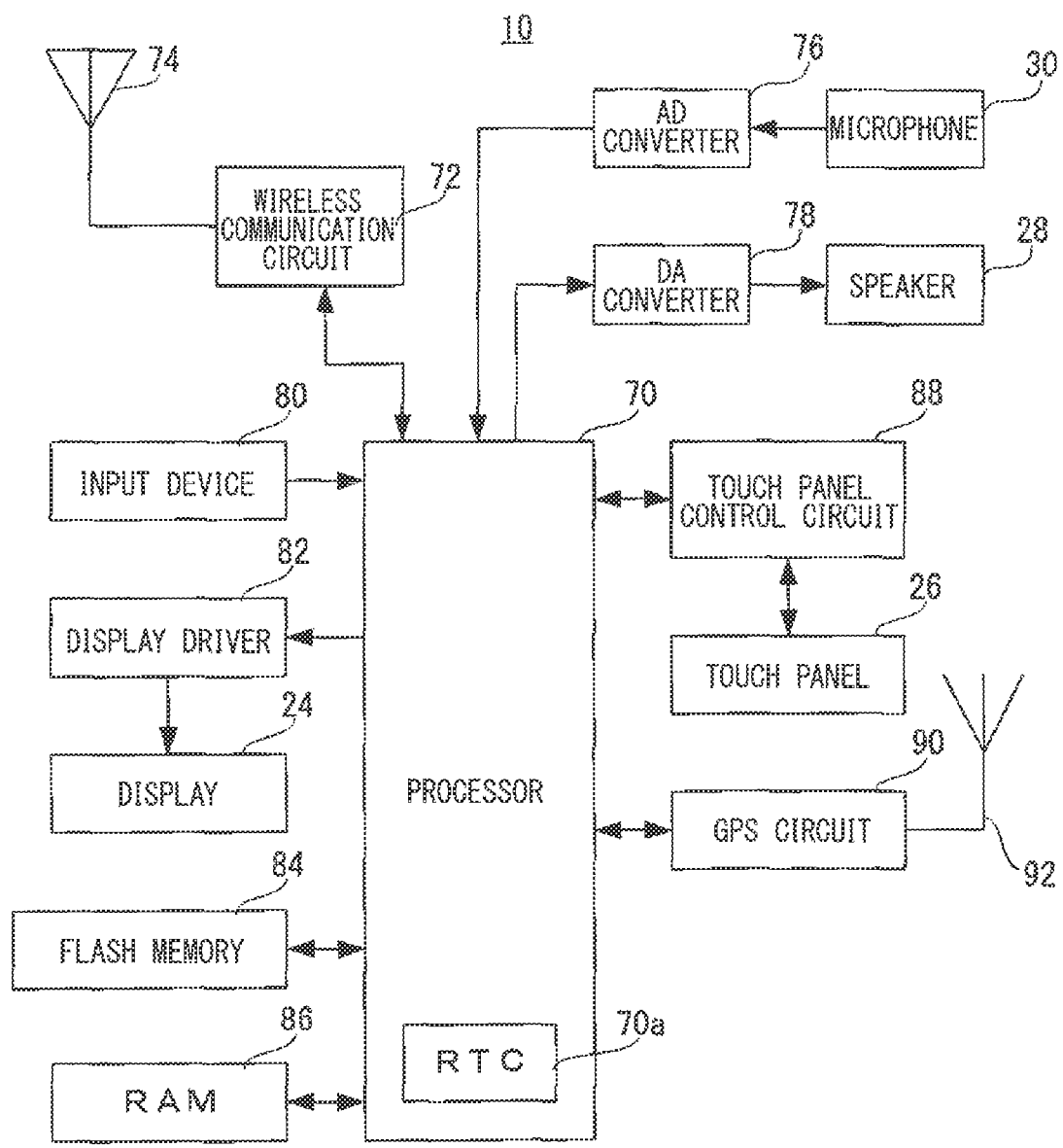

F I G. 15
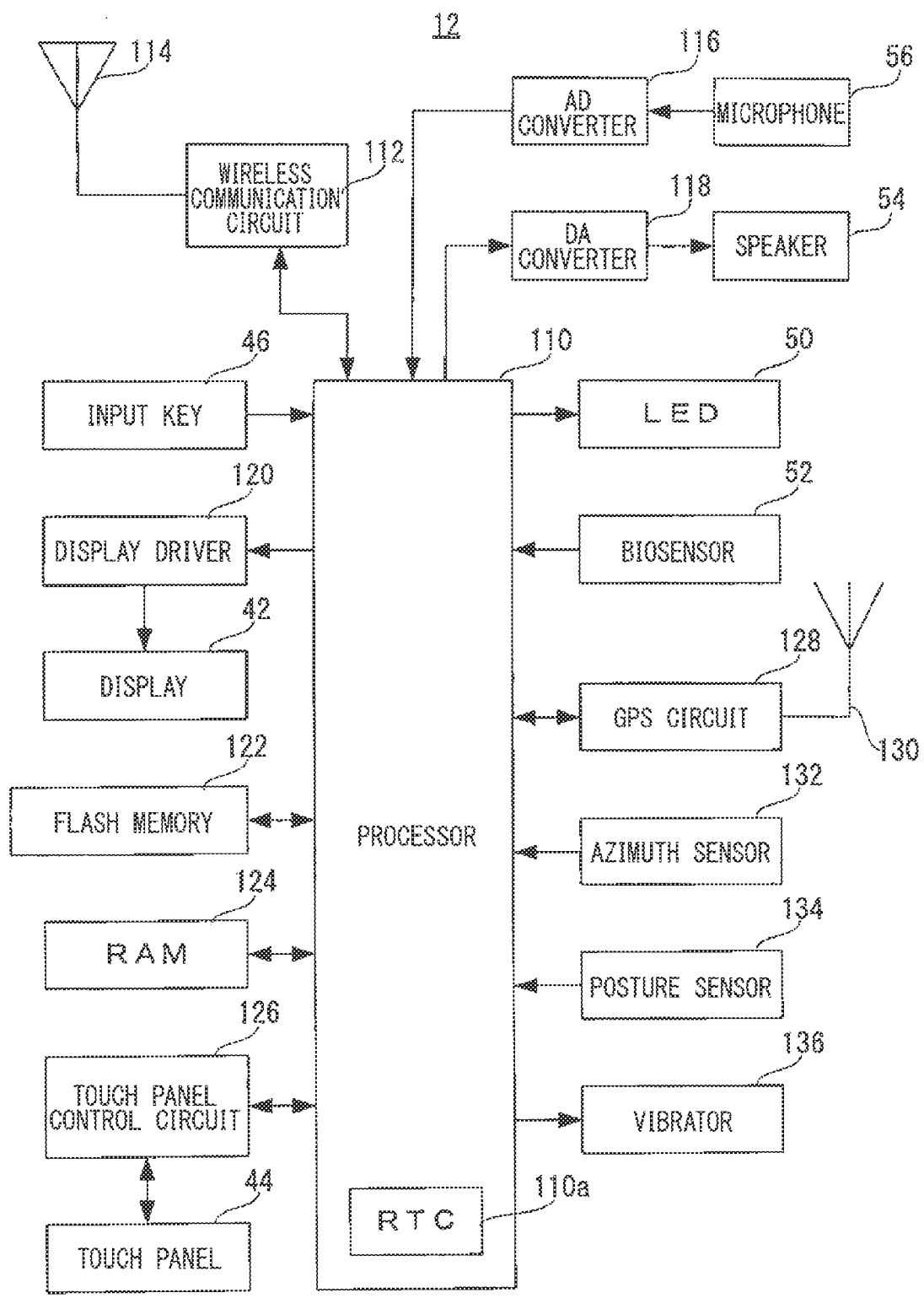

F I G. 16
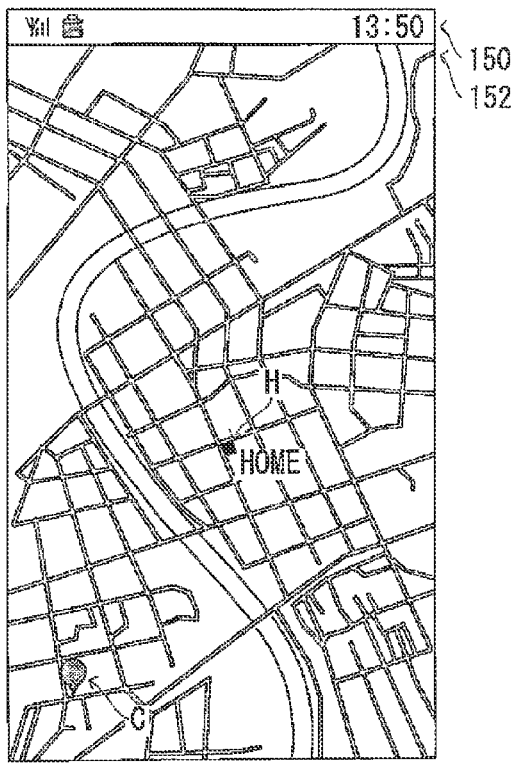
F I G. 17
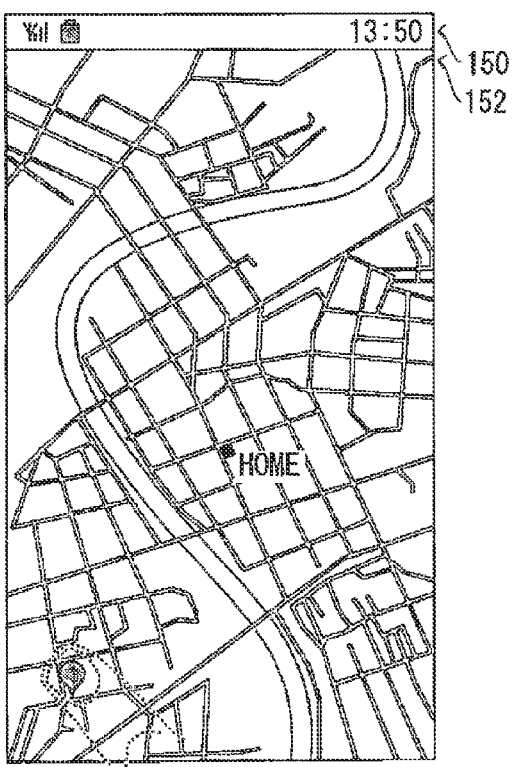

FIG. 22
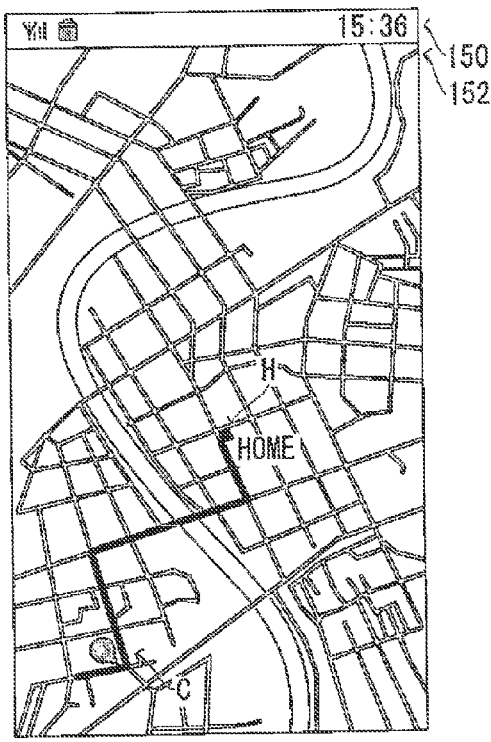
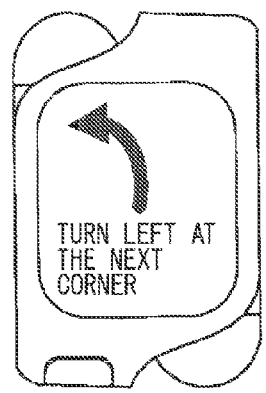
FIG. 23
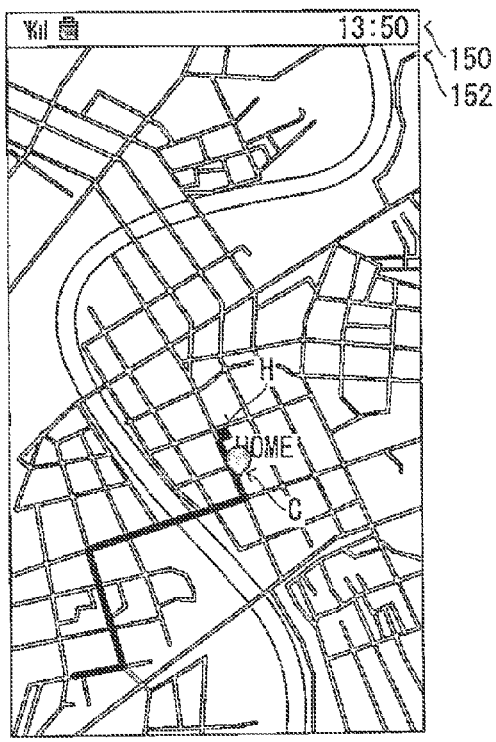
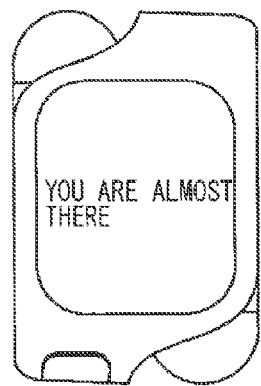

ADVANCE NOTIFICATION SYSTEM, ADVANCE NOTIFICATION METHOD, AND MOBILE COMMUNICATION DEVICE

CROSS-REFERENCE TO RELATED APPLICATION

The present application is a continuation in part based on PCT Application No. PCT/JP2015/054854, filed on Feb. 20, 2015, which claims the benefit of Japanese Application No. 2014-031823, filed on Feb. 21, 2014. PCT Application No. PCT/JP2015/054854 is entitled "ADVANCE NOTIFICATION SYSTEM, ADVANCE NOTIFICATION PROGRAM, ADVANCE NOTIFICATION METHOD AND MOBILE COMMUNICATION TERMINAL" and Japanese Application No. 2014-031823 is entitled "ADVANCE NOTIFICATION SYSTEM, ADVANCE NOTIFICATION PROGRAM, ADVANCE NOTIFICATION METHOD AND MOBILE COMMUNICATION DEVICE." The contents of which are incorporated by reference herein in their entirety.

FIELD

Embodiments of the present disclosure relate to techniques for providing advance notifications.

BACKGROUND

Techniques for managing the activities of, for example, a child have been proposed.

SUMMARY

An advance notification system, an advance notification method, and a mobile communication device are disclosed. In one embodiment, an advance notification system comprises a first mobile device and a second mobile device. The first mobile device stores a schedule including a scheduled time and a scheduled place and comprises a transmitter and at least one first processor. The second mobile device acquires a device position of the second mobile device itself. The at least one first processor determines whether an advance notification is required on the basis of the device position and the scheduled place. The at least one first processor also causes the transmitter to transmit the advance notification to the second mobile device when determining that the advance notification is required.

In one embodiment, an advance notification method is a method employed in an advance notification system. The advance notification system includes a first mobile device that stores a schedule including a scheduled time and a scheduled place and a second mobile device that acquires a device position of the second mobile device itself. The method comprises determining, by a processor of the advance notification system, whether an advance notification is required on the basis of the device position and the scheduled place. The advance notification is provided on the second mobile device when the processor determines that the advance notification is required.

In one embodiment, a mobile communication device comprises a storage, a receiver, at least one processor, and a transmitter. The storage stores a schedule including a scheduled time and a scheduled place. The receiver receives a device position acquired by another mobile device. The at least one processor determines whether an advance notification is required on the basis of the device position and the scheduled place. The transmitter transmits advance notification information to the another mobile device when the at least one processor determines that the advance notification is required.

BRIEF DESCRIPTION OF THE DRAWINGS

FIG. 14 illustrates a diagram showing an example of an electrical configuration of the mobile phone.

FIG. 15 illustrates a diagram showing an example of an electrical configuration of the wearable terminal.

FIG. 16 illustrates a diagram showing an example of the state in which a map is displayed on a display.

FIG. 17 illustrates the state in which a tap is performed on a terminal position icon.

FIG. 22 illustrates an example of the state in which the route guidance is provided.

FIG. 23 illustrates another example of the state in which the route guidance is provided.

DETAILED DESCRIPTION

<First Embodiment>

Figure 1:
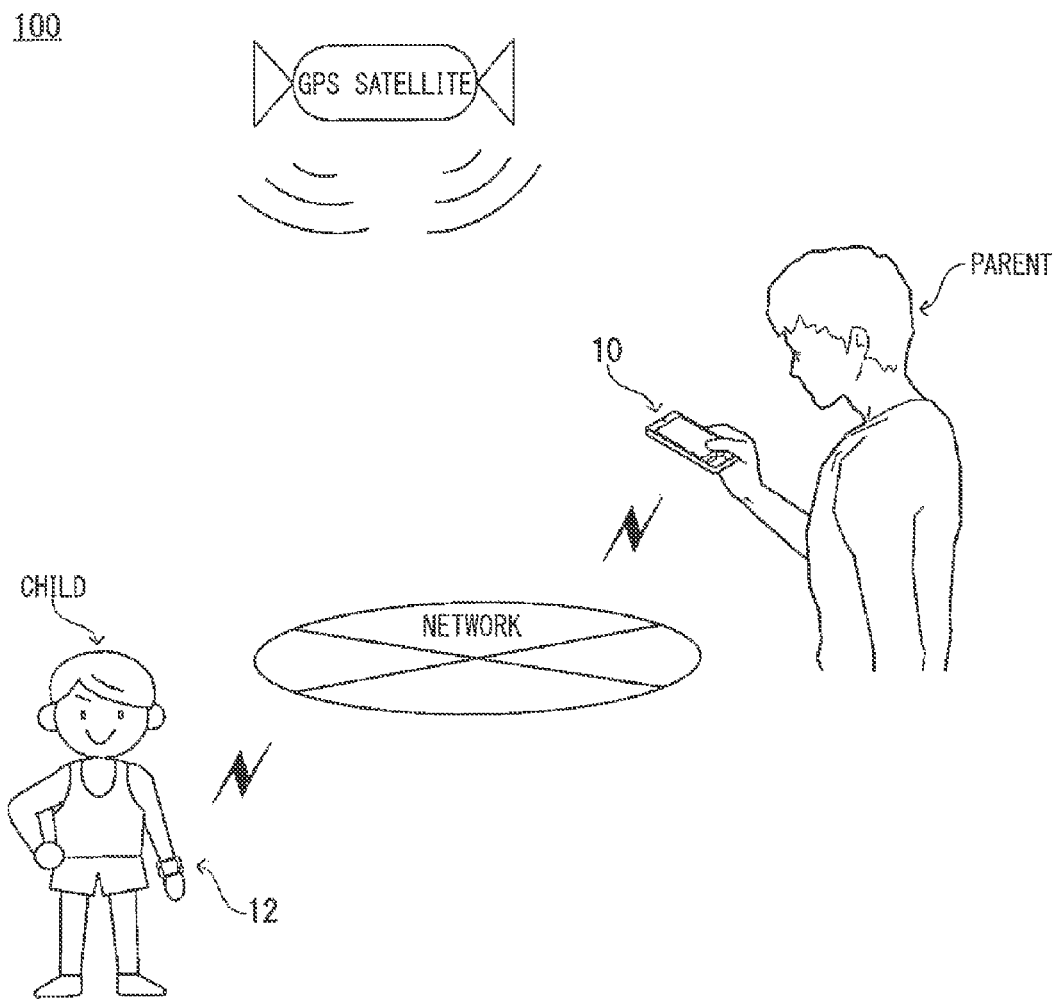
FIG. 1 illustrates a diagram showing an example of a configuration of a route guidance system.

As illustrated in FIG. 1, a route guidance system 100 includes a mobile phone 10 and a wearable terminal 12. The mobile phone 10 and the wearable terminal 12 can individually determine their current positions upon receipt of global positioning system (GPS) signals from GPS satellites. The mobile phone 10 and the wearable terminal 12 can perform voice calls and data communications with each other through a network.

The route guidance system 100 can provide route guidance on the wearable terminal 12, using the data communications between the mobile phone 10 and the wearable terminal 12 through the network.

The route guidance system 100 can provide a notification of a schedule on the wearable terminal 12 in response to synchronization of schedules between the mobile phone 10 and the wearable terminal 12. When necessary, an advance notification of the schedule is also provided on the wearable terminal 12. Thus, the route guidance system 100 is also referred to as an advance notification system.

The mobile phone 10 is also referred to as a first mobile terminal. In one embodiment, the mobile phone 10 is a mobile terminal that can display a map, receive input of a route for the route guidance, and register schedules. The mobile phone 10 can be designed to be carried by a parent, and thus may be also referred to as a parent-targeted mobile terminal.

The wearable terminal 12 is also referred to as a second mobile terminal. In one embodiment, the wearable terminal 12 can display an image for the above-mentioned route guidance and necessary information other than the image. The wearable terminal 12 can be designed to be worn by a child on his or her arm (body), and thus may be also referred to as a child-targeted mobile terminal.

The mobile phone 10 can perform various functions such as a voice call function, an e-mail function, a GPS function, a scheduling function, a text inputting and editing function, and a calculator function. Thus, the mobile phone 10 is also referred to as a high-functionality mobile terminal. Meanwhile, it may not be required that the wearable terminal 12 be capable of performing the functions including the voice call function, the e-mail function, the text inputting and editing function, and the calculator function. It may be only required that the wearable terminal 12 at least have the GPS function, the scheduling function, and the display function of displaying the above-mentioned image for the route guidance and the necessary information other than the image. Thus, the wearable terminal 12 may be also referred to as a low-functionality mobile terminal in contrast to the high-functionality mobile terminal mentioned above. In another embodiment, both the first mobile terminal and the second mobile terminal may be the mobile phones 10.

Figure 2:
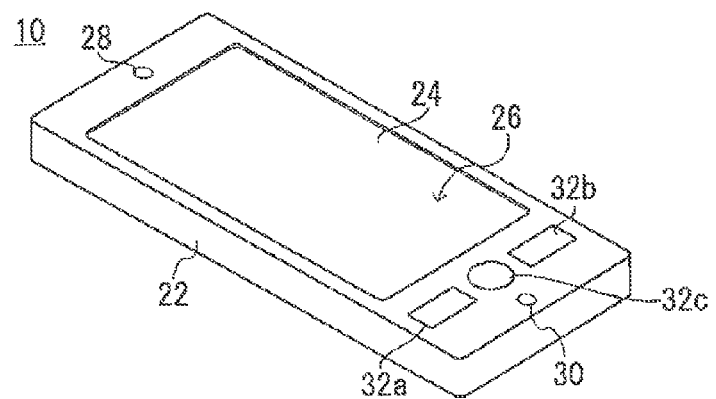
FIG. 2 illustrates an example of an external view of a mobile phone.

As illustrated in FIG. 2, the mobile phone 10 is, for example, a smartphone. The mobile phone 10 includes a housing 22 having a vertically-oriented flat rectangular shape, for example. The mobile phone 10 may be any mobile terminal such as a tablet terminal, a tablet personal computer (PC), a notebook PC, or a personal digital assistant (PDA).

On a main surface (front surface) of the housing 22 is located a display 24. The display 24 includes, for example, a liquid crystal panel or an organic electroluminescent (EL) panel. On the display 24 can be located a touch panel 26.

On the main surface of the housing, at one vertical end of the housing 22 is located a speaker 28. On the main surface of the housing, at another vertical end of the housing 22 is located a microphone 30.

On the main surface of the housing 22 are located a plurality of hard keys. Along with the touch panel 26, the plurality of hard keys are included in input operation means. In one embodiment, the plurality of hard keys include a call key 32a, a call end key 32b, and a menu key 32c.

In response to a touch operation performed on a dial pad displayed on the display 24, a telephone number is input to the mobile phone 10. Then, in response to an operation performed on the call key 32a, a voice call is started in the mobile phone 10. The voice call is ended in the mobile phone 10 in response to an operation performed on the call end key 32b. The power of the mobile phone 10 can be turned on or off in response to a long press on the call end key 32b.

In response to an operation on the menu key 32c, a home screen is displayed on the display 24. In this state, the parent can perform touch operations on, for example, an object displayed on the display 24 to select the object and confirm the selection. The touch panel 26 can detect the touch operations.

The mobile phone 10 can perform a map function of displaying a map including the current position, the e-mail function, and a browser function in addition to the telephone function. The graphical user interfaces (GUIs), such as keys, and icons displayed on the display 24 are also correctively referred to as objects in the following description.

Figure 3:
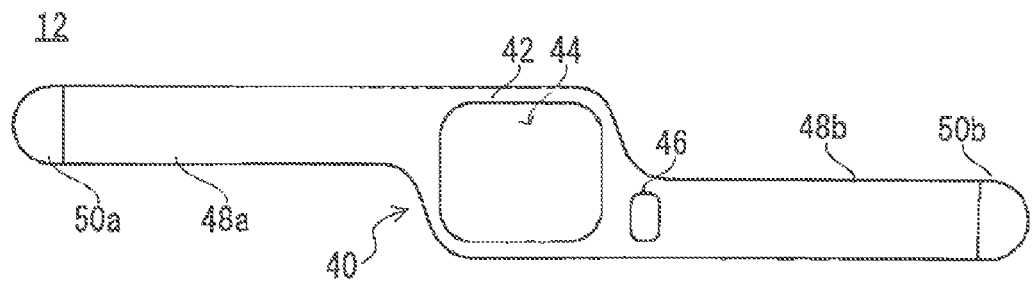
FIG. 3 illustrates an example of a front surface of a wearable terminal having a normal shape.
Figure 4:
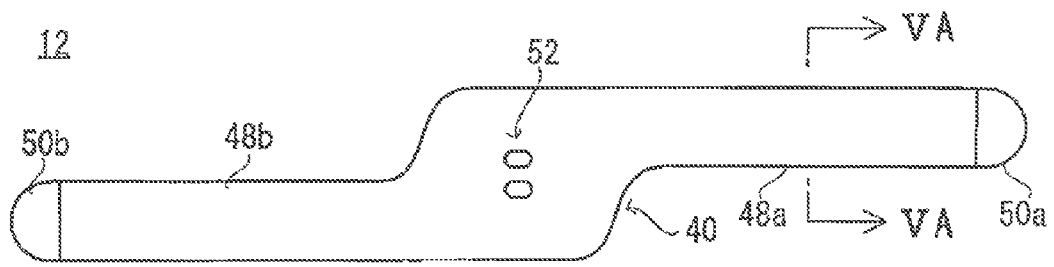
FIG. 4 illustrates an example of a rear surface of the wearable terminal having the normal shape.
Figure 5:
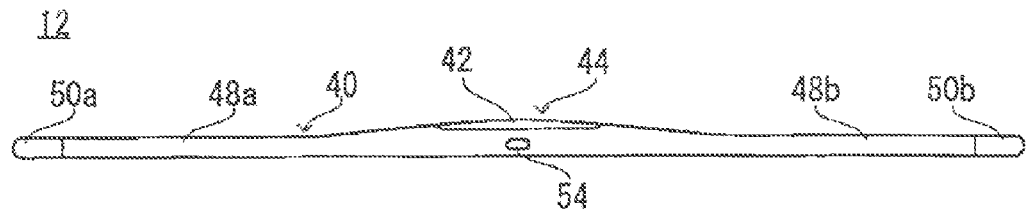
FIG. 5 illustrates an example of a left side surface of the wearable terminal having the normal shape.
Figure 6:
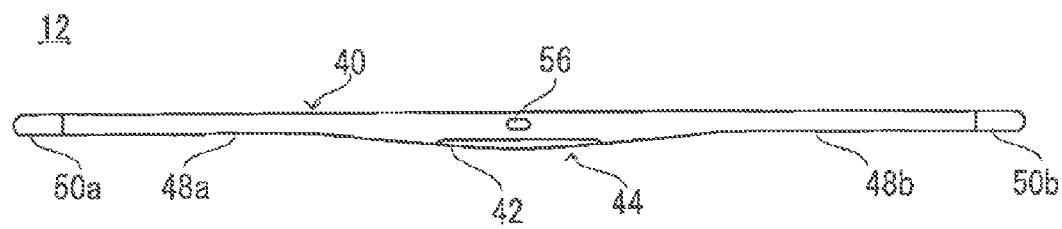
FIG. 6 illustrates an example of a right side surface of the wearable terminal having the normal shape.

FIG. 3 illustrates a front surface of the wearable terminal 12 having a normal shape. FIG. 4 illustrates a rear surface of the wearable terminal 12 having the normal shape. FIG. 5 illustrates a left side surface of the wearable terminal 12 having the normal shape. FIG. 6 illustrates a right side surface of the wearable terminal 12 having the normal shape. The "normal shape" refers to the state in which a first belt 48a and a second belt 48b, which will be described below, are straight, not bent. When the wearable terminal 12 has the normal shape, the wearable terminal 12 is not worn by the user.

As illustrated in FIGS. 3 to 6, the wearable terminal 12 includes a case 40 made of silicon resin, for example. The wearable terminal 12 in one embodiment is, for example, IPX5/7 waterproof certified.

For example, the case 40 is a wristwatch-shaped case. On the approximately central part of the front surface of the case 40 is located a display 42. The display 42 includes, for example, a liquid crystal panel or an organic EL panel. On the display 42 is located a touch panel 44. Adjacent to the display 42 is located an input key 46.

The case 40 includes the first belt 48a and the second belt 48b with the display 42 therebetween. On the tips of the first belt 48a and the second belt 48b are located a first LED 50a and a second LED 50b, respectively. Each of the first LED 50a and the second LED 50b is also referred to as an "LED 50."

On a rear surface of the case 40 is located a biosensor 52. On a left side surface of the case 40 is located a speaker 54. On a right side surface of the case 40 is located a microphone 56.

For example, the child (user) can make necessary settings on the wearable terminal 12 through the use of the GUIs displayed on the display 42 and perform a voice call accordingly while his or her arm is fitted with the wearable terminal 12. In a case where the child selects a call destination displayed on the wearable terminal 12, such as a telephone number assigned to the parent-targeted mobile terminal, a voice call is started in the wearable terminal 12. A hands-free voice call can be performed on the wearable terminal 12. Thus, the child can catch a voice output from the speaker 54 by moving the wearable terminal 12 close to his or her face. The child can input a voice to the microphone 56. When the child performs an operation on a call end GUI that is displayed on the display 42 during the voice call, the voice call is ended. The setting of the hands-free operation can be changed such that the child can perform a voice call without the need for moving the wearable terminal 12 close to his or her face.

The security buzzer function is performed in response to a long press on the input key 46. In a case where the security buzzer function is performed, the first LED 50a and the second LED 50b emit red light and the speaker 54 outputs a warning sound, for example. When the security buzzer function is performed, the wearable terminal 12 can determine the current position of the wearable terminal 12 itself and can send, together with the current position, a message that the security buzzer function is performed to the mobile phone 10. The current position determined by the wearable terminal 12 is also referred to as a terminal position.

The security buzzer function is automatically performed in the event of detection of the state in which the wearable terminal 12 is taken off from the child's arm. The wearable terminal 12 can determine that the wearable terminal 12 is taken off from the child's arm if the biosensor 52 fails to detect the biological information on the child (such as the child's pulse). The security buzzer function is not performed in the event of removal of the wearable terminal 12 while a removal mode is set. The removal mode may be set through the GUI displayed on the display 42 or may be set in accordance with a command signal from the mobile phone 10. With the wearable terminal 12 in the removal mode being taken off from the child's arm, the security buzzer function is performed in response to a long press on the input key 46, for example.

Figure 7:
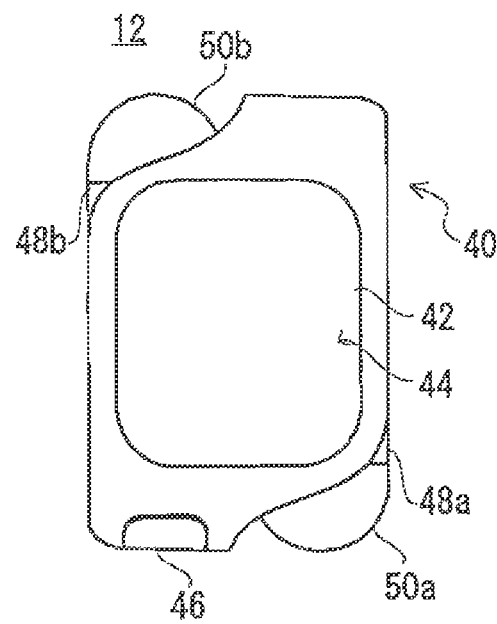
FIG. 7 illustrates a front side of the wearable terminal having a fitted shape.
Figure 8:
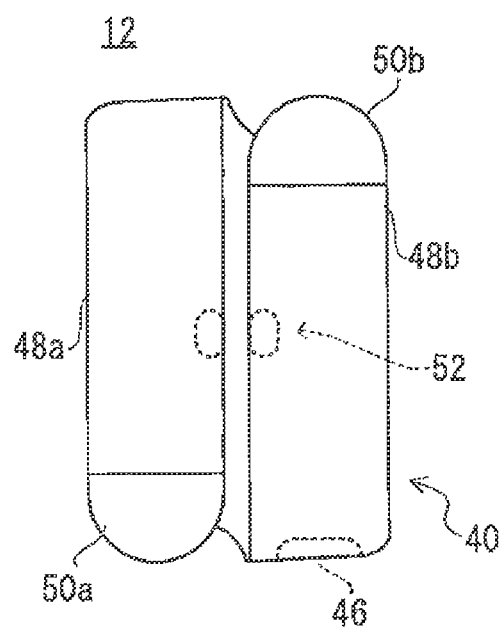
FIG. 8 illustrates a rear side of the wearable terminal having the fitted shape.
Figure 9:
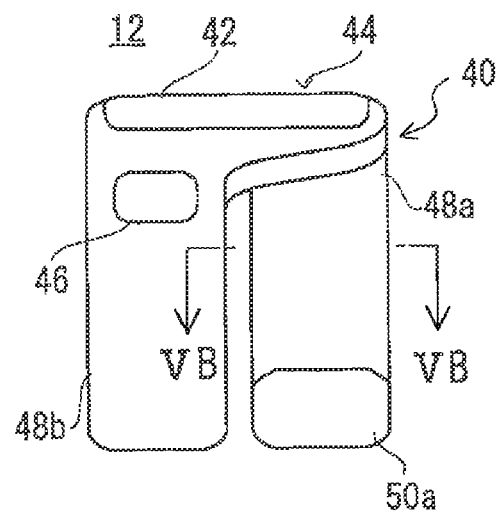
FIG. 9 illustrates a side surface of the wearable terminal having the fitted shape.
Figure 10:
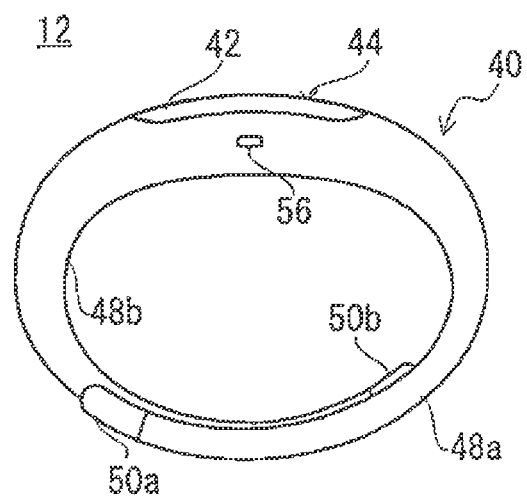
FIG. 10 illustrates another side surface of the wearable terminal having the fitted shape.
Figure 11:
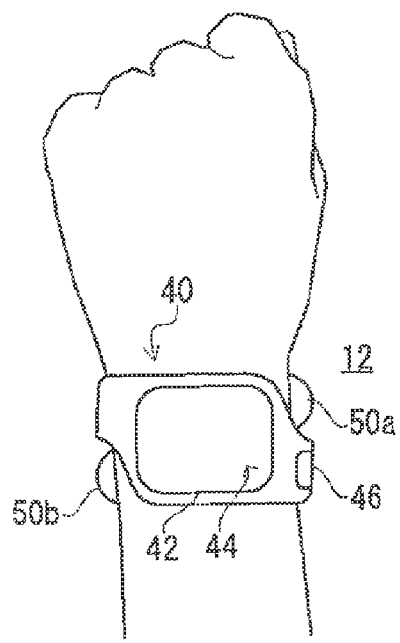
FIG. 11 illustrates an example of the state in which the wearable terminal is worn.

FIGS. 7 to 11 each illustrate an example of a shape (hereinafter referred to as a fitted shape) of the wearable terminal 12 in the state of being worn. FIG. 7 illustrates a front side of the wearable terminal 12 having the fitted shape. FIG. 8 illustrates a rear side of the wearable terminal 12 having the fitted shape. FIG. 9 illustrates a side surface of the wearable terminal 12 having the fitted shape. FIG. 10 illustrates another side surface of the wearable terminal 12 having the fitted shape. FIG. 11 illustrates an example of the state in which the wearable terminal 12 is worn.

As illustrated in FIGS. 7 to 10, the first belt 48a and the second belt 48b of the wearable terminal 12 having the fitted shape do not overlap each other and are bent to the rear side of the wearable terminal 12. The wearable terminal 12 has a ring shape when the wearable terminal 12 having the fitted shape is viewed from another side surface (see FIG. 10). In the state where the wearable terminal 12 is worn on an arm, the wearable terminal 12 having the ring shape is wrapped around the arm.

Figure 12:
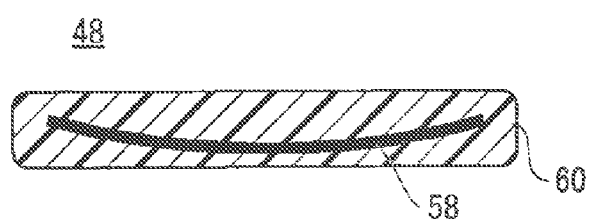
FIG. 12 illustrates an example of a cross section taken along the line VA-VA in FIG. 4.
Figure 13:
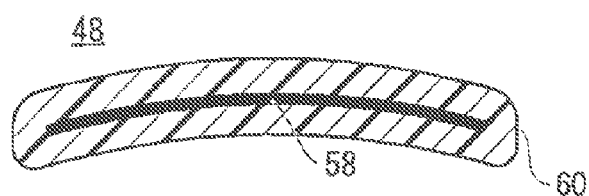
FIG. 13 illustrates an example of a cross section taken along the line VB-VB in FIG. 9.

FIG. 12 illustrates a cross section of the wearable terminal 12 taken along the line VA-VA in FIG. 4. FIG. 13 illustrates a cross section of the wearable terminal 12 taken along the line VB-VB in FIG. 9. As illustrated in FIGS. 12 and 13, the first belt 48a and the second belt 48b include plates 58 made of metal and extending from approximately tip portions to the base portions of the respective belts. The plates 58 are surrounded by and covered with silicon resin 60. The first belt 48a and the second belt 48b can keep their respective normal shapes and fitted shapes owning to the plates 58, which are also called stainless steel spring wires.

In particular, as illustrated in FIG. 12, a cross section of the plate 58 is bent to the rear side of the case 40 in the normal shape. The plate 58 in this state as a whole keeps an approximately flat shape, and thus each of the first belt 48a and the second belt 48b can keep the normal shape illustrated in, for example, FIG. 4.

Meanwhile, as illustrated in FIG. 13, in the fitted shape, the central portion of the cross section of the plate 58 is bent to the front side of the case 40, or equivalently, in a direction opposite to the direction in FIG. 12. The plate 58 in this state keeps a shape bent to the inner side (the rear side of the case 40), and thus each of the first belt 48a and the second belt 48b can keep the fitted shape illustrated in, for example, FIG. 9.

When forces with which the plate 58 is bent to the rear side of the case 40 is exerted on the plate 58 in the state illustrated in FIG. 12, the plate 58 changes its shape as illustrated in FIG. 13. This means that the shape of the plate 58 is changed from an approximately flat shape to a curved shape. The shape of each of the first belt 48a and the second belt 48b is changed from the normal shape to the fitted shape accordingly. The plate 58 in the curved state has forces acting thereon to keep the curved state. Even if the first belt 48a and the second belt 48b each having the fitted shape are stretched toward the front side of the case 40, the plates 58 cause the respective belts to recover the shapes illustrated in FIG. 10. In a case where forces are exerted on the plate 58 in the state illustrated in FIG. 13 such that the plate 58 becomes approximately flat, the shape of the cross section of the plate 58 can be changed to the shape illustrated in FIG. 12.

Thus, the wearable terminal 12 can be worn by a child on his or her arm without the need for fastening together the first belt 48*a* and the second belt 48*b* each having the fitted shape. In particular, the curved plates 58 have forces acting thereon to keep their respective shapes, so that the wearable terminal 12 can be stably worn by a child on his or her arm regardless of the size of the arm. The case 40 may be made of the silicon resin 60 having a higher coefficient of friction. Once being worn on an arm, the wearable terminal 12 having this configuration is less likely to slip down from the arm. In another embodiment, the first belt 48*a* and the second belt 48*b* of the wearable terminal 12 may be fastened to each other through a mechanical component such as a fastening member. In still another embodiment, it is not required that the first belt 48*a* and the second belt 48*b* each having the fitted shape overlap each other, and further the tip of the first belt 48*a* and the tip of the second belt 48*b* may have a gap therebetween. This means that the wearable terminal 12 having the fitted shape in the still another embodiment has a ring shape as a whole, and particularly has a partially open ring shape.

As illustrated in FIG. 14, the mobile phone 10 in one embodiment illustrated in FIG. 1 or 2 includes, for example, a processor 70 called a computer or a central processing unit (CPU). The processor 70 is connected with, for example, a wireless communication circuit 72, an analog-to-digital (AD) converter 76, a digital-to-analog (DA) converter 78, an input device 80, a display driver 82, a flash memory 84, a random-access memory (RAM) 86, a touch panel control circuit 88, and a GPS circuit 90.

The processor 70 includes a real time clock (RTC) 70*a* that outputs time information. The processor 70 can perform overall control over the mobile phone 10. When coming into use, all or part of the program preset in the flash memory 84 is expanded in the RAM 86. The processor 70 can operate in accordance with the program in the RAM 86. The RAM 86 can be also used as a work area or a buffer area of the processor 70. The RAM 86 is also referred to as a memory.

In accordance with various embodiments, the processor 70 may be implemented as a single integrated circuit (IC) or as multiple communicatively coupled ICs and/or discrete circuits. It is appreciated that the processor 70 can be implemented in accordance with various known technologies.

In one embodiment, the processor 70 includes one or more circuits or units configurable to perform one or more data computing procedures or processes by executing instructions stored in an associated memory, for example. In other embodiments, the processor 70 may be implemented as firmware (e.g. discrete logic components) configured to perform one or more data computing procedures or processes.

In accordance with various embodiments, the processor 70 may include one or more processors, controllers, microprocessors, microcontrollers, application specific integrated circuits (ASICs), digital signal processors, programmable logic devices, field programmable gate arrays, or any combination of these devices or structures, or other known devices and structures, to perform the functions described herein.

The input device 80 includes the plurality of hard keys (such as the call key 32*a*) illustrated in FIG. 2. Thus, the input device 80 forms an operation acceptor that can accept key operations performed on the hard keys. The information (key dada) on the hard keys accepted by the operation acceptor is input to the processor 70.

The wireless communication circuit 72 is a circuit to transmit and receive, through an antenna 74, radio waves for voice calls and e-mails. In one embodiment, the wireless communication circuit 72 is a circuit to perform wireless communications based on the code division multiple access (CDMA) system. For example, in accordance with outgoing call (outgoing voice call) operation accepted by the touch panel 26, the wireless communication circuit 72 can execute, in accordance with the instructions from the processor 70, an outgoing voice call processing to output an outgoing voice call signal through the antenna 74. The outgoing voice call signal is transmitted to the telephone at the other end of the connection through the base station and the communication network. When the telephone at the other end of the connection performs an incoming voice call processing, the communicable state is established, and the processor 70 can execute a telephone communication processing accordingly.

The wireless communication circuit 72 is wirelessly connected with a network (such as a communication network or a telephone network) through the antenna 74. The mobile phone 10 can establish data communications with the wearable terminal 12 through the network accordingly.

The AD converter 76 is connected with the microphone 30 illustrated in FIG. 2. A voice signal from the microphone 30 is converted into digital voice data by the AD converter 76 and is input to the processor 70. The DA converter 78 is connected with the speaker 28. The DA converter 78 can convert the digital voice data into a voice signal and provide the voice signal to the speaker 28 through an amplifier. Thus, the speaker 28 can output a voice based on the voice data. During the execution of the telephone communication processing, voices collected by the microphone 30 are transmitted to the telephone at the other end of the connection and voices collected in the telephone at the other end of the connection are output from the speaker 28.

The display driver 82 is connected with the display 24 illustrated in FIG. 2. The display 24 can display a video or an image in accordance with video data or image data output from the processor 70. The display driver 82 includes a video memory that can temporarily store the image data displayed on the display 24. The video memory can store data output from the processor 70. The display driver 82 can cause the display 24 to display an image in accordance with the contents of the video memory. That is, the display driver 82 can control the display of the display 24 connected with the display driver 82 in accordance with the instructions from the processor 70. Thus, the processor 70 is also referred to as a display controller. The display 24 may include a backlight. The display driver 82 can control the brightness and turning on and off of the backlight in accordance with the instructions from the processor 70.

The touch panel control circuit 88 is connected with the touch panel 26. The touch panel control circuit 88 can supply the touch panel 26 with, for example, a needed voltage. The touch panel control circuit 88 can input, to the processor 70, a touch start signal indicating the start of a touch on the touch panel 26, an end signal indicating the end of the touch, and coordinate data indicating a touch position being the target position of the touch. The processor 70 can determine, on the basis of the coordinate data, which object is touched.

In one embodiment, the touch panel 26 is a capacitive touch panel that can detect changes in capacitance generated between the surface of the touch panel 26 and an object such as a finger (hereinafter referred to as a "finger" for convenience). The touch panel 26 can detect that the touch panel 26 is touched by, for example, one finger or a plurality of fingers. Thus, the touch panel 26 is also referred to as a pointing device. The touch panel control circuit 88 can output, to the processor 70, the coordinate data indicating the position of the touch operation within the touch valid range of the touch panel 26. When a touch operation is performed on the surface of the touch panel 26, the position of the operation, the direction of the operation, and the like are input to the mobile phone 10.

The mobile phone 10 may include a non-transitory recording medium that can be read by the processor 70 other than the flash memory 84 and the RAM 86. The mobile phone 10 may include, for example, a hard disk drive, a solid state drive (SSD), and a universal serial bus (USB) memory.

Examples of touch operations according to one embodiment include a tap operation, a long tap operation, a flick operation, and a slide operation.

The tap operation refers to an operation of bringing a finger into contact (touch) with the surface of the touch panel 26 and then moving (releasing) the finger off the surface of the touch panel 26 in a short period of time. The long tap operation refers to an operation of keeping a finger in contact with the surface of the touch panel 26 for a period equal to or greater than a predetermined period and then moving the finger off the surface of the touch panel 26. The flick operation refers to an operation of bringing a finger into contact with the surface of the touch panel 26 and then causing the finger to flip in a desired direction at a speed equal to or greater than a predetermined speed. The slide operation refers to an operation of moving a finger in a desired direction while keeping the finger in contact with the surface of the touch panel 26 and then moving the finger off the surface of the touch panel 26.

The above-mentioned slide operation includes the so-called drag operation, which is a slide operation of bringing a finger into contact with an object displayed on the surface of the display 24 and moving the object. The operation of moving a finger off the surface of the touch panel 26 after the drag operation is referred to as a drop operation.

The word "operation" may be hereinafter omitted from the phrases including the tap operation, the long tap operation, the flick operation, the slide operation, the drag operation, and the drop operation. It is not required that the touch operation be performed with a finger of the user. Alternatively, the touch operation may be performed with, for example, a stylus pen.

The GPS circuit 90 is activated in determining the current position. Upon receipt of input of a GPS satellite signal received by a GPS antenna 92, the GPS circuit 90 can execute a positioning processing in accordance with the GPS signal. The GPS circuit 90 can compute the longitude, the latitude, and the altitude (elevation) as GPS information (position information) accordingly.

Although FIG. 1 illustrates a single GPS satellite for simplicity, the three-dimensional positioning associated with the current position requires GPS signals received from four or more GPS satellites. As long as GPS signals from three GPS satellites, instead of GPS signals from four or more GPS satellites, are received, the longitude and the latitude can be computed through the two-dimensional positioning.

The RAM 86 can store map data and the mobile phone 10 can display a map corresponding to the current position on the basis of the GPS information computed by the GPS circuit 90.

With reference to FIG. 15, the wearable terminal 12 according to one embodiment illustrated in FIG. 1 includes a processor 110 called a computer or a CPU. The processor 110 is connected with, for example, the input key 46, the LEDs 50, the biosensor 52, a wireless communication circuit 112, an AD converter 116, a DA converter 118, a display driver 120, a flash memory 122, a RAM 124, a touch panel control circuit 126, a GPS circuit 128, an azimuth sensor 132, a posture sensor 134, and a vibrator 136. The wireless communication circuit 112 is connected with an antenna 114. The display driver 120 is connected with the display 42. The touch panel control circuit 126 is connected with the touch panel 44. The GPS circuit 128 is connected with a GPS antenna 130. The AD converter 116, the DA converter 118, the display driver 120, the flash memory 122, the RAM 124, the touch panel control circuit 126, and the GPS circuit 128 are substantially the same as the corresponding components of the mobile phone 10, and thus the same description will not be repeated for simplicity.

The processor 110 includes an RTC 110*a* that outputs time information. The processor 110 can perform overall control over the wearable terminal 12 to perform functions including the voice call function, the security buzzer function, and the data communication function. The information (key data) on the hard keys accepted by the input key 46 is input to the processor 110.

In accordance with various embodiments, the processor 110 may be implemented as a single integrated circuit (IC) or as multiple communicatively coupled ICs and/or discrete circuits. It is appreciated that the processor 110 can be implemented in accordance with various known technologies.

In one embodiment, the processor 110 includes one or more circuits or units configurable to perform one or more data computing procedures or processes by executing instructions stored in an associated memory, for example. In other embodiments, the processor 110 may be implemented as firmware (e.g. discrete logic components) configured to perform one or more data computing procedures or processes.

In accordance with various embodiments, the processor 110 may include one or more processors, controllers, microprocessors, microcontrollers, application specific integrated circuits (ASICs), digital signal processors, programmable logic devices, field programmable gate arrays, or any combination of these devices or structures, or other known devices and structures, to perform the functions described herein.

The wireless communication circuit 112, which is substantially the same as the wireless communication circuit 72 of the mobile phone 10, can perform wireless communications based on the CDMA system. For example, when an operation of selecting a telephone number directory entry is performed on the wearable terminal 12, the wireless communication circuit 112 can execute, in accordance with the instructions from the processor 110, the outgoing voice call processing to output an outgoing voice call signal through the antenna 114. The outgoing voice call signal is transmitted to, for example, the mobile phone 10 through the base station and the communication network. For example, when the incoming voice call processing is performed in the mobile phone 10, the communicable state in which the wearable terminal 12 can communicate with the mobile phone 10 is established, and then the processor 110 executes the voice call processing. In this state, the child can communicate with the parent through the speaker 54 and the microphone 56.

When the antenna 114 receives an outgoing voice call signal transmitted by the mobile phone 10, the wireless communication circuit 112 can notify the processor 110 of an incoming call, and then the processor 110 can execute the incoming call processing accordingly. For example, when the incoming call processing is executed, the speaker 54 outputs ringtones and the vibrator 136, which will be described below, causes the wearable terminal 12 to vibrate. When the incoming voice call operation is performed on the wearable terminal 12, the communicable state in which the wearable terminal 12 can communicate with, for example, the mobile phone 10 is established, and then the processor 110 executes the voice call processing.

The display 42 displays GUIs for operating the wearable terminal 12. The GUIs are operated through the touch panel 44. For example, with the GUI for performing an outgoing call operation being displayed on the display 42, when the child performs an outgoing call operation using the touch panel 44, an outgoing voice call signal is output as described above.

The LEDs 50 can emit light in a plurality of colors, such as red, blue, and green. The processor 110 controls, for example, the color of emission light and the cycle of flashing. As described above, the LEDs 50 emit red light when the security buzzer function is performed.

The biosensor 52 is a sensor for measuring a pulse of a person (child). As described above, the processor 110 determines, through the use of the output from the biosensor 52, whether the wearable terminal 12 is worn by the child. While the biosensor 52 measures the child's pulse, the processor 110 determines that the wearable terminal 12 is worn by the child. While the biosensor 52 does not measure the child's pulse, the processor 110 determines that the wearable terminal 12 is not worn by the child.

The azimuth sensor 132, which is also referred to as an electromagnetic compass or a direction output unit, includes three geomagnetic sensors and a control circuit. The control circuit extracts geomagnetic data from magnetic data detected by the three geomagnetic sensors, and then outputs the geomagnetic data to the processor 110. The processor 110 computes the azimuth angle (azimuth or direction) data with reference to geomagnetic data output from the control circuit and causes the buffer of the RAM 124 to store the data as the direction of the wearable terminal 12. In one embodiment, the azimuth is given in degrees counting clockwise, with 0 degrees at north (N), 90 degrees at east (E), 180 degrees at south (S), and 270 degrees at west (W). Each geomagnetic sensor includes a hall element. Alternatively, each geomagnetic sensor may include a magnet-resistive (MR) element or a magnet-impedance (MI) element.

The posture sensor 134 is used to detect the movement of the wearable terminal 12. The posture sensor 134 is, for example, a piezoelectric gyroscope. The piezoelectric gyroscope can detect angular velocities around three axes (X, Y, and Z axes) and output the detection results to the processor 110. The processor 110 detects the movement and the inclination of the wearable terminal 12 on the basis of the angular velocities around the individual axes detected by the posture sensor 134.

For example, the processor 110 determines, in accordance with the posture detected by the posture sensor 134, whether the child is checking the wearable terminal 12. While the child is checking the wearable terminal 12, the processor 110 detects, by using the azimuth sensor 132, the azimuth the child faces, namely, the heading direction of the child. The wearable terminal 12 transmits, to the mobile phone 10, terminal position information including the current position (terminal position), the posture, and the azimuth.

The vibrator 136 is a motor including an eccentric load mounted on the rotation axis. The turning on and off of the vibrator 136 is controlled by the processor 110. When the vibrator 136 is activated (turned on), vibrations of the vibrator 136 cause the wearable terminal 12 to vibrate.

The wearable terminal 12 may include a non-transitory recording medium that can be read by the processor 110 other than the flash memory 122 and the RAM 124. The wearable terminal 12 may include, for example, a hard disk drive, an SSD, and a USB memory.

FIG. 16 illustrates an example of a map displayed by the display 24 of the mobile phone 10. As illustrated in FIG. 16, the display range of the display 24 includes a state display area 150 and a function display area 152. In the state display area 150 are displayed a pictogram indicating the radio wave reception condition at the antenna 74, a pictogram indicating the remaining battery life of the secondary battery, and a time of day. In the function display area 152 is displayed a map. On the map are displayed a home position icon H indicating a registered home position (hereinafter referred to as a "home position") and a terminal position icon C indicating the terminal position received from the wearable terminal 12. For example, when the parent causes the mobile phone 10 to perform the function (hereinafter referred to as a "management function") of managing the wearable terminal 12, map data including the home position and the current position of the child (the terminal position of the wearable terminal 12) is read from the RAM 86, and then a map including the above-mentioned information is displayed on the display 24.

With the map being displayed, when a route to home (destination) is input to the mobile phone 10 (parent-targeted mobile terminal), the route guidance is provided on the wearable terminal 12 (child-targeted mobile terminal).

Figure 18:
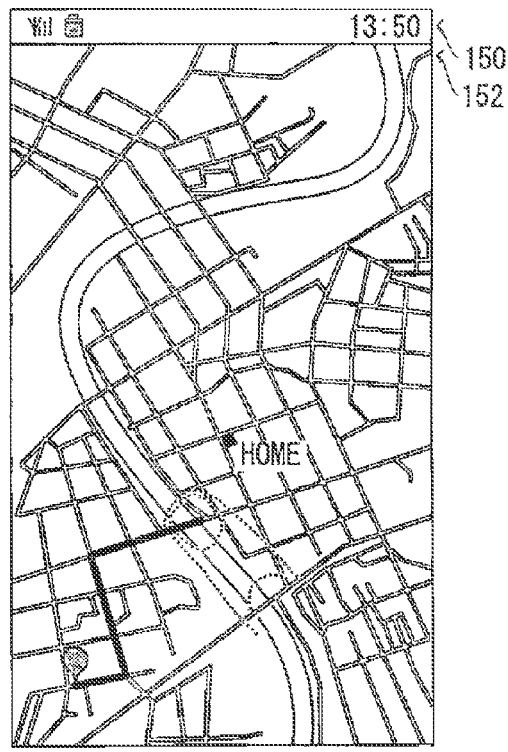
FIG. 18 illustrates an example of the state in which a route is input.
Figure 19:
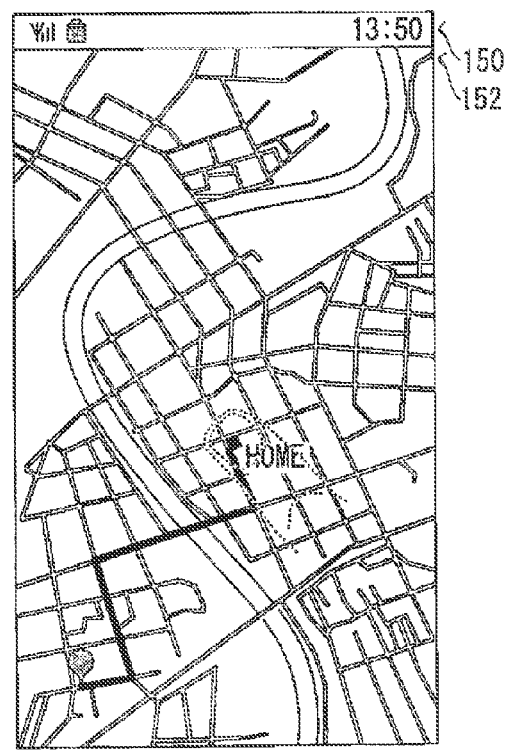
FIG. 19 illustrates another example of the state in which the route is input.
Figure 20:
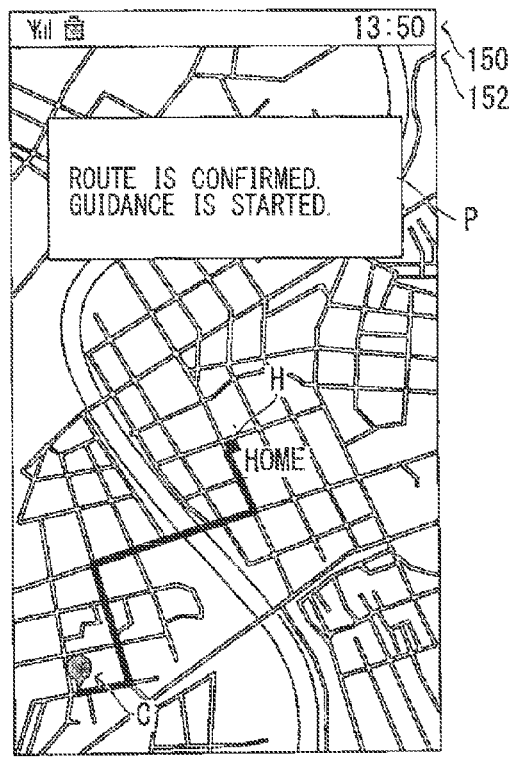
FIG. 20 illustrates an example of the state in which the input route is confirmed.
Figure 21:
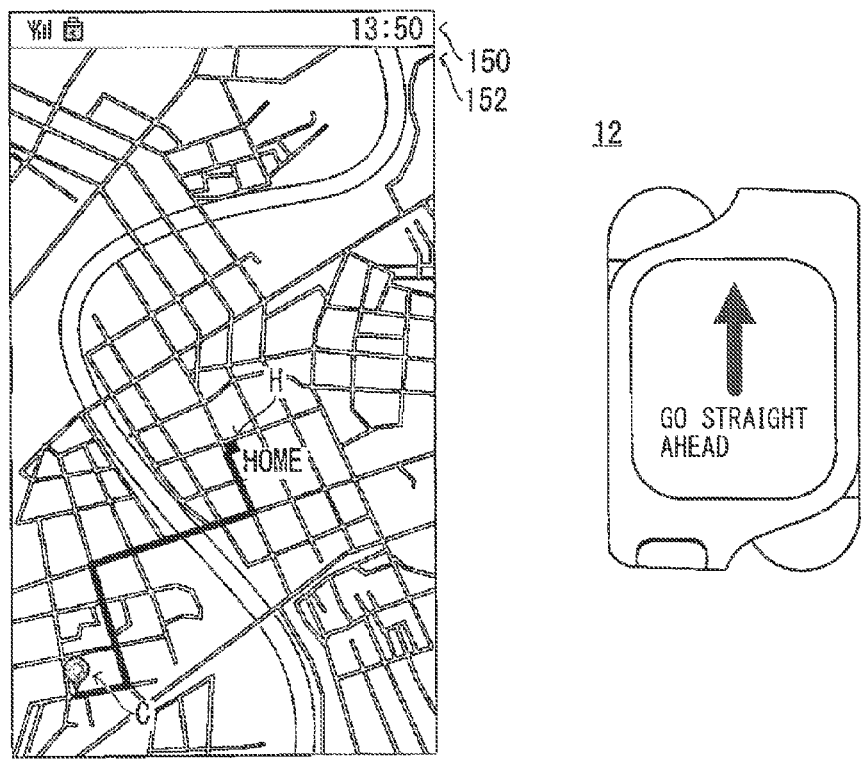
FIG. 21 illustrates an example of the state in which route guidance is started.

With reference to FIGS. 17 to 20, description will be given on an operation of inputting a route. As illustrated in FIG. 17, when the parent performs a tap on the terminal position icon C indicating the position of the wearable terminal 12, the mobile phone 10 becomes ready to receive input of a route. The parent performs a slide operation to input a route from the terminal position icon C to the home position icon H in this state as illustrated in FIG. 18, and then performs a tap on the home position icon H as illustrated in FIG. 19 to complete the inputting of the route to the mobile phone 10. When the parent completes the inputting of the route to the mobile phone 10, the display 24 displays, as illustrated in FIG. 20, a pop-up P conveying a message that the input route is confirmed and that the route guidance associated with the route is started. At this time, the mobile phone 10 creates guidance information including a message that the route guidance is provided. When the guidance information is transmitted to the wearable terminal 12, the display 42 displays the message that the route guidance is provided. The wearable terminal 12 activates the vibrator 136.

After a lapse of time with no operation being performed on the mobile phone 10 in the state of being ready to receive input of a route, this state of being ready to receive input of a route is released (canceled).

With reference to FIGS. 21 to 24, description will be given on actions during the route guidance. Firstly, the mobile phone 10 reads the terminal position and the azimuth (the orientation of the child) from the terminal position information transmitted from the wearable terminal 12, and creates guidance information indicating which direction the child should head into. If the orientation of the child agrees with the heading direction of the child on the route, the guidance information including a message and an icon for advising the child to keep going is created. When the wearable terminal 12 receives the guidance information, the display 42 of the wearable terminal 12 displays the message and the icon for advising the child to keep going.

Then, guidance information is created in the mobile phone 10 every time the terminal position information is changed. The created guidance information is transmitted to the wearable terminal 12. As illustrated in FIG. 22, the position of the terminal position icon C on the display 24 of the mobile phone 10 is updated corresponding to the child's position that has changed in accordance with, for example, the route guidance. When the child wearing the wearable terminal 12 approaches a branch point, such as an intersection, the mobile phone 10 creates the guidance information indicating the path the child should follow. In a case where the path turns left with respect to the orientation of the child, guidance information including a message advising the child to turn left at the branch point and an icon indicating the left is created. The display 42 of the wearable terminal 12 that has received the guidance information displays the message advising the child to turn left with respect to the heading direction of the child and the icon indicating the left (see FIG. 22).

As illustrated in FIG. 23, in a case where the terminal position of the wearable terminal 12 moves close to the home position, the guidance information notifying that the child is in close proximity to home is created. When the wearable terminal 12 receives the guidance information, the display 42 of the wearable terminal 12 displays a message that the child is in close proximity to home.

Figure 24:
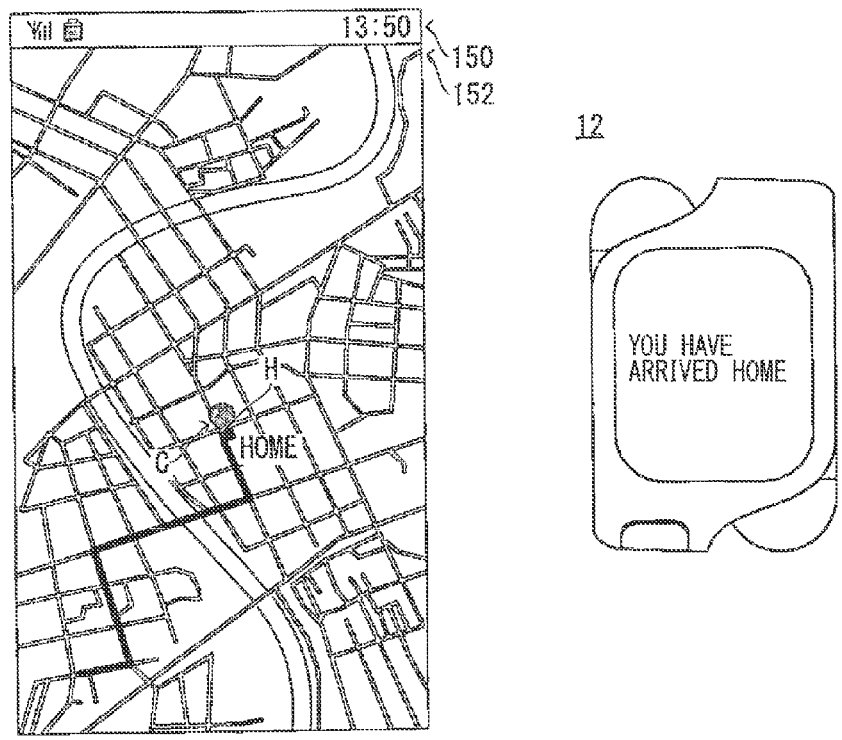
FIG. 24 illustrates an example of the state in which the route guidance is ended.

As illustrated in FIG. 24, when the mobile phone 10 determines that the wearable terminal 12 (the child) has arrived home on the basis of the terminal position and the home position, the mobile phone 10 transmits, to the wearable terminal 12, arrival information notifying that the child has arrived home. When the wearable terminal 12 receives the arrival information, the display 42 of the wearable terminal 12 displays a message that the child has arrived home.

As described above, the appropriate route guidance can be easily provided in accordance with the position of the child. The child can head toward the destination by following the route guidance.

In another embodiment, the speaker 54 may output the contents of the guidance information during the route guidance. In still another embodiment, the route guidance may be provided by voices output from the speaker 54 with no use of the display on the display 42.

In yet still another embodiment, a route may be changed during the route guidance. The parent may register a dangerous place or a dangerous road as a security alert zone. With respect to any place, location information indicating the state of the area around the relevant place may be registered.

Next, description will be given on the scheduling function. When the scheduling function is executed in the mobile phone 10, a schedule screen is displayed in the function display area 152. The schedule screen includes the schedule for the day on which the scheduling function is performed, namely, the schedule for the relevant day. For example, the parent's (own) schedules for Jan. 9, 2014 including a "MTG (meeting)" at a "workplace" scheduled for that day from 2 pm, "shopping" at a "supermarket" scheduled for that day from 4:30 pm, and a "supper" at "home" scheduled for that day from 6 pm are indicated on the left side of the schedule screen illustrated in FIG. 25. The child's schedules for Jan. 9, 2014 including "school" scheduled to last until 3 pm and "study" at a "tutoring school" scheduled for that day from 3:30 pm are indicated on the right side of the schedule screen.

The child's schedules may be registered by the parent through the use of the mobile phone 10 or by the child through the use of the wearable terminal 12. In a case where the child's schedules are registered through the use of the wearable terminal 12, the details of the registered schedules may be transmitted to the mobile phone 10. If the schedule are registered by the child, the parent can check, on his or her own mobile phone 10, the schedules registered by the child.

In response to a touch operation on the date portion, a screen allowing the checking of the schedule for another date is displayed. In response to a touch operation on the lower right key marked with "+," a registration screen for registering a new schedule is displayed. In response to a tap on a schedule, a detailed screen is displayed which includes the scheduled time being the start time of the schedule and the scheduled place being the place in which activities are performed in accordance with the schedule. In one embodiment, in response to a touch on the parent's schedule for which "home" is set as the scheduled place and a subsequent slide to the child's schedule, the parent's schedule being the target of the touch is synchronized with the child's schedule.

Figure 25:
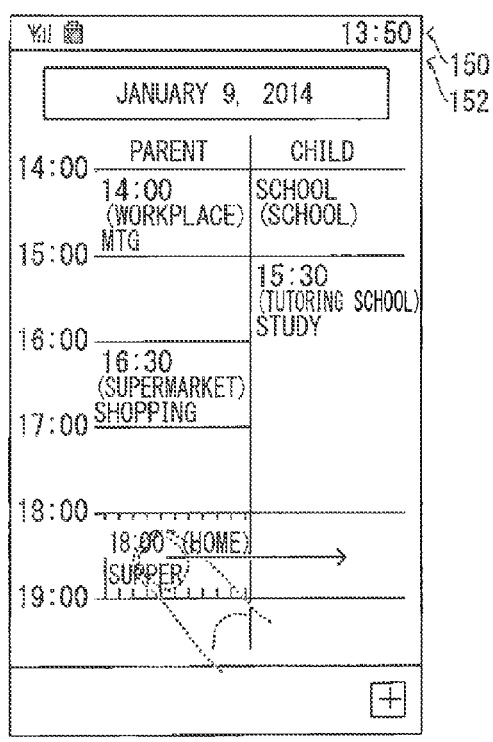
FIG. 25 illustrates an example of the state in which an operation of synchronizing schedules is performed on a schedule screen displayed on the display of the mobile phone.
Figure 26:
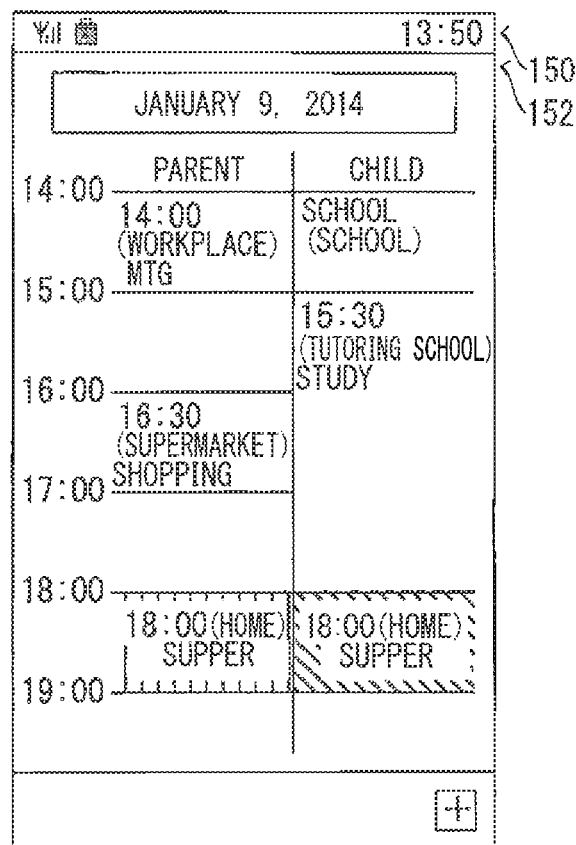
FIG. 26 illustrates an example of the state in which the schedules are in synchronization with each other.
Figure 27:
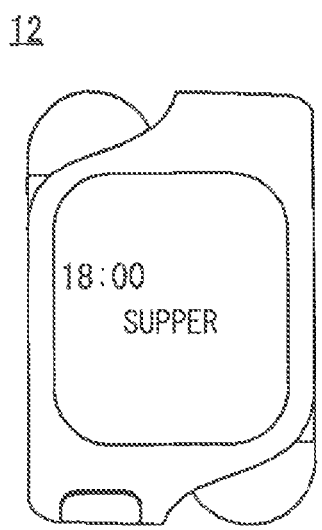
FIG. 27 illustrates a diagram showing an example of the state in which schedule information is displayed on a display of the wearable terminal.

As illustrated in FIGS. 25 and 26, in response to a touch on the "supper" at "home" scheduled for that day from 6 pm and a subsequent slide to the child's schedule, the scheduled "supper" is synchronized and is additionally registered as the child's schedule. When the scheduled time associated with the scheduled "supper" arrives, in other words, at 6 pm, a notification of schedule information including the details of the schedule is provided on the wearable terminal 12 as illustrated in FIG. 27.

In one embodiment, in a case where the schedule on the mobile phone 10 is synchronized with the schedule on the wearable terminal 12 and the child is away from the scheduled place ("home" in one embodiment), when the remaining time before the scheduled time becomes equal to a predetermined time, an advance notification is provided.

Figure 28:
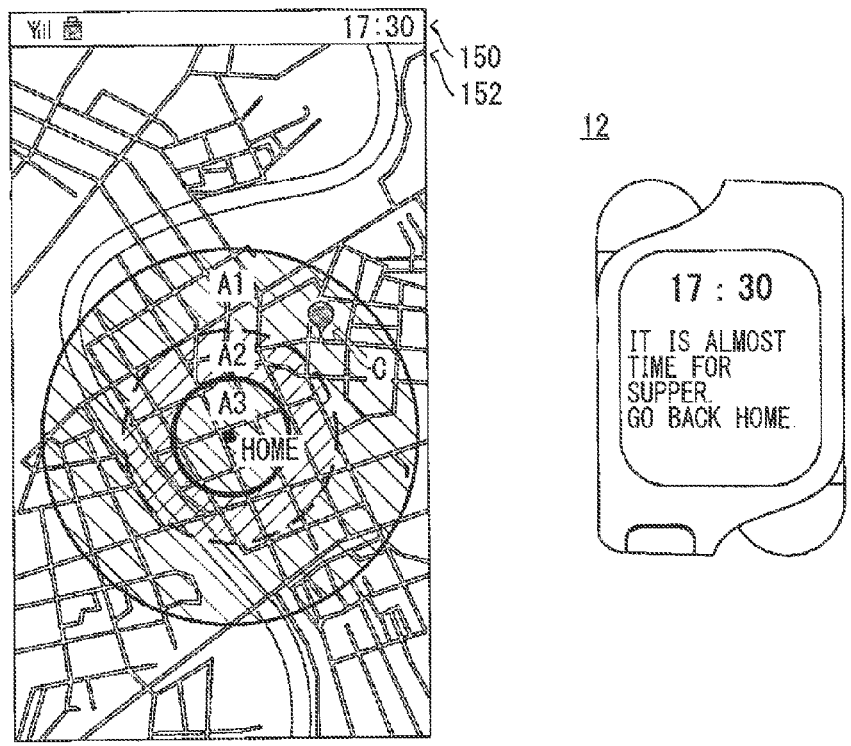
FIG. 28 illustrates an example of the state in which an advance notification is provided when the remaining time before a scheduled time becomes equal to a first predetermined time.
Figure 29:
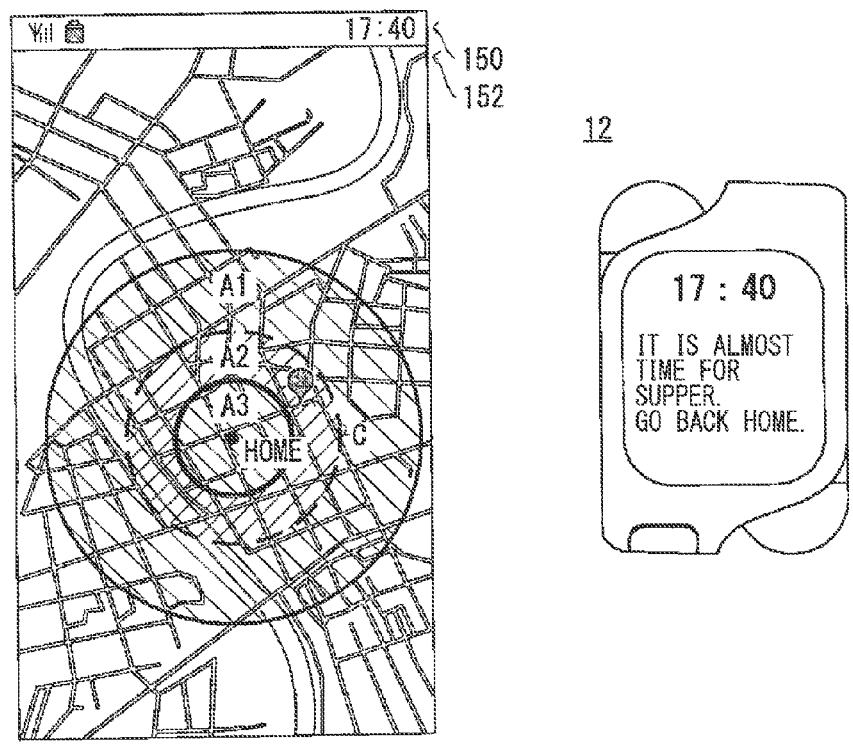
FIG. 29 illustrates an example of the state in which an advance notification is provided when the remaining time before the scheduled time becomes equal to a second predetermined time.

If the schedule on the mobile phone 10 is synchronized with the schedule on the wearable terminal 12 and the child (terminal position) is away from home, moving ranges A are set as illustrated in FIGS. 28 and 29, with the center of the individual moving range A being set at the home position icon H. The individual moving range A is also referred to as a predetermined range and is set on the basis of the moving speed of the child. The moving ranges A in one embodiment include a first moving range A1, a second moving range A2 located inboard with respect to the first moving range A1, and a third moving range A3 located inboard with respect the second moving range A2. The time required for the child found in the first moving range A1 to come home is estimated to be a first predetermined time (for example, 30 minutes), and thus the first moving range A1 is associated with the first predetermined time. Similarly, the time required for the child found in the second moving range A2 to come home is estimated to be a second predetermined time (for example, 20 minutes), and thus the second moving range A2 is associated with the second predetermined time. The time required for child found in the third moving range A3 to come home is estimated to be a third predetermined time (for example, 10 minutes), and thus the third moving range A3 is associated with the third predetermined time. There is a drop of a fixed amount of time (for example, 10 minutes) between the first predetermined time and the second predetermined time and between the second predetermined time and the third predetermined time.

In a case where the child (terminal position icon C) is found in the first moving range A1 and the remaining time before the scheduled time becomes equal to the first predetermined time, advance notification information is provided on the wearable terminal 12 as illustrated in FIG. 28. The advance notification information may include the details of the schedule and a message that the first predetermined time is left before the scheduled time. Consequently, the child becomes aware that it is time to go home in order to have "supper" at "home" from 6 pm as scheduled. This means that the advance notification is provided to advise the child to adhere to the schedule. Upon receipt of the advance notification of schedule, the child can initiate an advance action to adhere to the schedule.

In a case where the child is found in the second moving range A2 and the remaining time before the scheduled time becomes equal to the second predetermined time, advance notification information is provided on the wearable terminal 12 as illustrated in FIG. 29. The advance notification information may include a message that the second predetermined time is left before the scheduled time. In a case where the child is found in the third moving range A3 and the remaining time before the scheduled time becomes equal to the third predetermined time, advance notification information is provided on the wearable terminal 12 (not shown). The advance notification may include a message that the third predetermined time is left before the scheduled time.

Thus, in the first embodiment, a determination can be made whether to provide an advance notification depending on which one of the moving ranges A the position of the child belongs to. This can simplify the processing of providing an advance notification. Furthermore, through the use of the moving ranges, advance notifications can be provided appropriately in accordance with the position of the child.

In particular, the parent can easily manage the activities of the child simply by performing scheduling and synchronization of schedules using the mobile phone 10.

In one embodiment, the synchronization of schedules has been described above assuming that "home" is set as the scheduled place. In another embodiment, schedules can be also synchronized in a case where a place other than "home" is set as the scheduled place. In this configuration, various places are registered as the scheduled places in advance.

The moving ranges A in the first embodiment are represented by circles. In another embodiment, the moving ranges A may be represented by, for example, polygons (including concave polygons). In still another embodiment, the number of the moving ranges A may be one, two, or not less than four.

The above description has provided an overview of the features of the first embodiment. The features will be described below in detail with reference to the memory map of the RAM 86 of the mobile phone 10 in FIG. 30, the memory map of the RAM 124 of the wearable terminal 12 in FIG. 31, and flowcharts in FIGS. 32 to 39.

Figure 30:
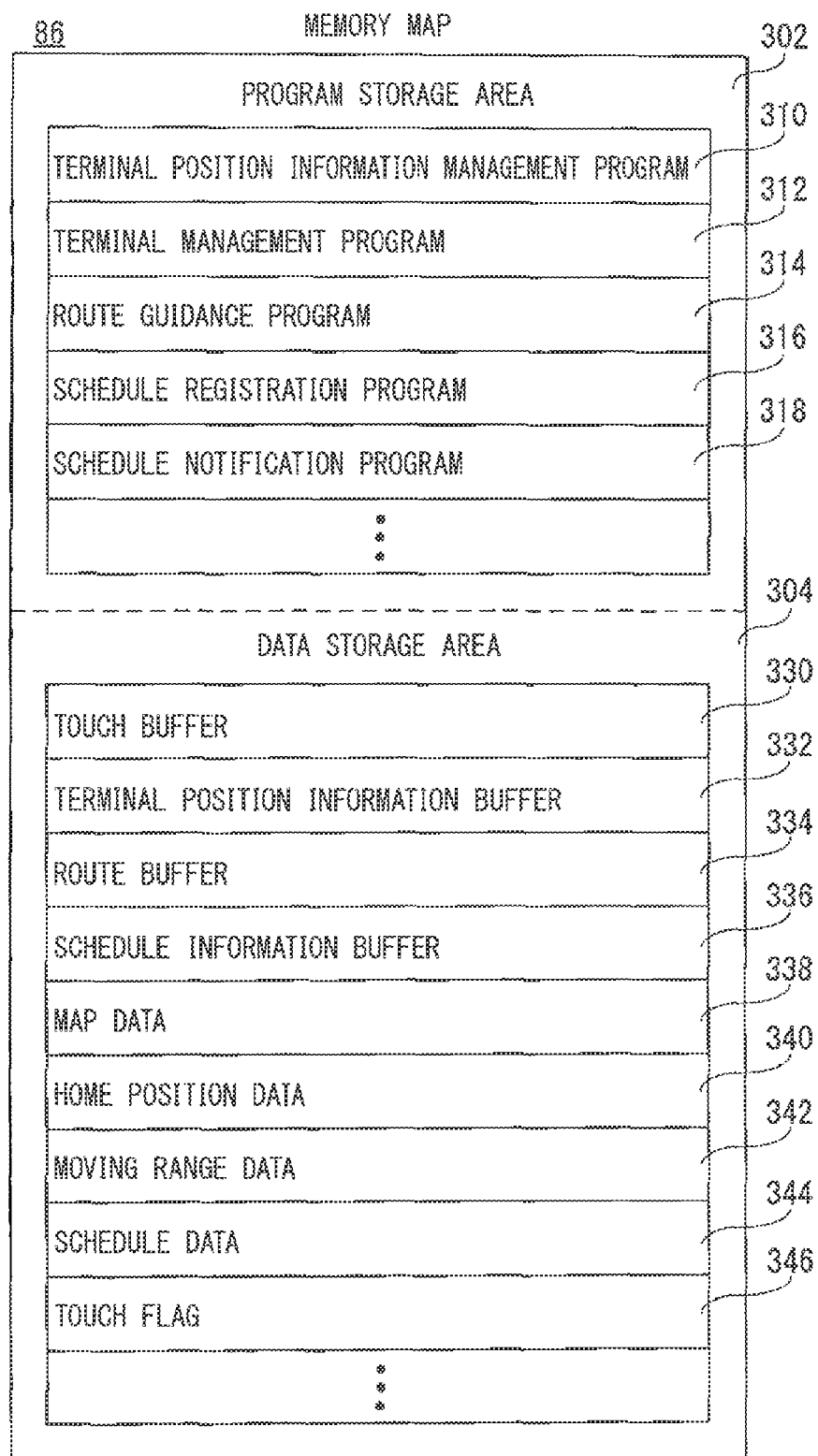
FIG. 30 illustrates a diagram showing an example of a memory map of a random-access memory (RAM) of the mobile phone.

With reference to FIG. 30, the RAM 86 of the mobile phone 10 includes a program storage area 302 and a data storage area 304 formed therein. As described above, the program storage area 302 is an area for reading and storing (expanding) all or part of the program data preset in the flash memory 84 (see FIG. 14).

In the program storage area 302 are stored a terminal position information management program 310 for receiving and storing the terminal position information transmitted by the wearable terminal 12, a terminal management program 312 for controlling the route guidance and the displaying of a map, a route guidance program 314 for providing the route guidance on the wearable terminal 12, a schedule registration program 316 for registering a schedule, a schedule notification program 318 for providing notifications of a variety of information associated with registered schedules being in synchronization with each other, and the like. Furthermore, a program for performing the functions, such as the e-mail function and the browser function, is also stored in the program storage area 302.

In the data storage area 304 of the RAM 86 are provided a touch buffer 330, a terminal position information buffer 332, a route buffer 334, a schedule information buffer 336, and the like. Furthermore, map data 338, home position data 340, moving range data 342, schedule data 344, and the like are stored in the data storage area 304. A touch flag 346 and the like are also provided in the data storage area 304.

In the touch buffer 330, data including the data on touch coordinates output by the touch panel control circuit 88 and the data on touch coordinates of the starting point and the endpoint of a touch operation is temporarily stored. The received terminal position information is temporarily stored in the terminal position information buffer 332. The input route is temporarily stored in the route buffer 334. The schedule information created in response to synchronization of schedules is temporarily stored in the schedule information buffer 336.

The map data 338 is the data on a map displayed during the route guidance and the registration of information. The home position data 340 is the data indicating the position of the registered home. The moving range data 342 is the data including the first moving range A1, the second moving range A2, and the third moving range A3 illustrated in, for example, FIG. 28. The schedule data 344 is the data on schedules registered on the mobile phone 10.

The touch flag 346 is the flag for determining whether the touch panel 26 is touched. The touch flag 346 includes, for example, a 1-bit register. If the touch flag 346 is on (set), the data value "1" is placed in the register. If the touch flag 346 is turned off (cleared), the data value "0" is placed in the register. The touch flag 346 is toggled on and off in accordance with the output from the touch panel control circuit 88.

In the data storage area 304, the data for displaying an object such as a GUI is stored, and another flag and a timer (counter) required in execution of the programs are provided.

Figure 31:
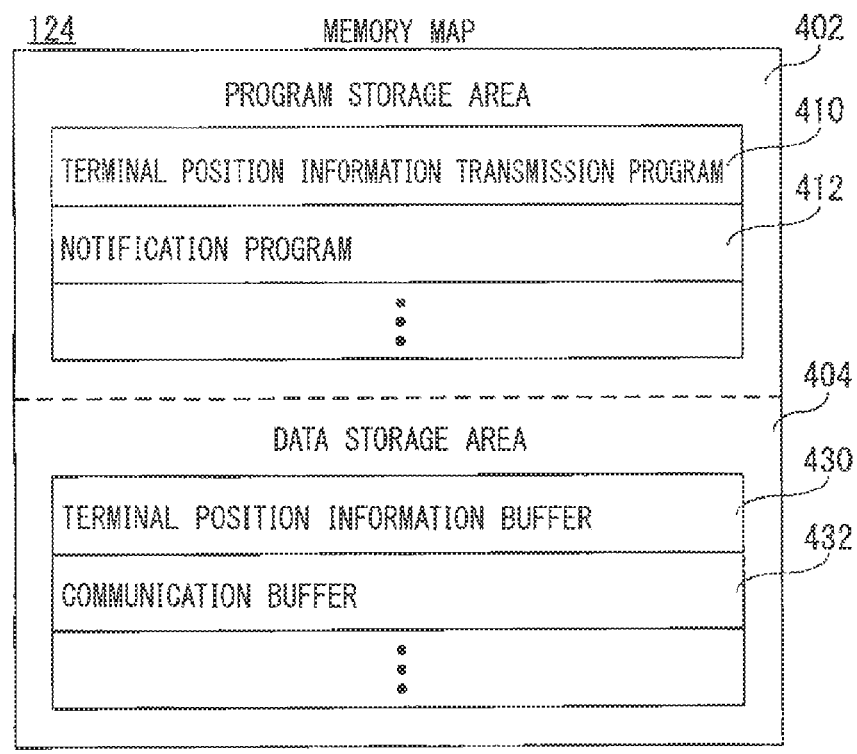
FIG. 31 illustrates a diagram showing an example of a memory map of a RAM of the wearable terminal.

With reference to FIG. 31, the RAM 124 of the wearable terminal 12 includes a program storage area 402 and a data storage area 404 formed therein. Similarly to the program storage area of the mobile phone 10, the program storage area 402 is the area for storing (expanding) all or part of the program data preset in the flash memory 122 (see FIG. 15).

In the program storage area 402 are stored a terminal position information transmission program 410 for transmitting the terminal position information to the mobile phone 10 and a notification program 412 for providing a notification of information transmitted from the mobile phone 10. Furthermore, programs for performing functions, such as the voice call function and the security buzzer function, are also stored in the program storage area 402.

In the data storage area 404 of the RAM 124 are provided a terminal position information buffer 430, a communication buffer 432, and the like.

In the terminal position information buffer 430, the terminal position information including the current position determined by the wearable terminal 12, the posture of the wearable terminal 12, and the detected azimuth is temporarily stored. The communication buffer 432 is the buffer in which information received from the mobile phone 10 including the guidance information, the schedule information, and the advance notification information is temporarily stored. Furthermore, in the data storage area 404, address book data including contact information is stored, and another flag and a timer (counter) required in execution of the programs are provided.

The processor 70 of the mobile phone 10 performs a plurality of tasks in parallel under control by a predetermined OS, namely, an OS based on Windows®, an OS based on Linux® such as Android®, or iOS®. The plurality of tasks include a terminal position information management processing in FIG. 32, a terminal management processing in FIG. 33, a route guidance processing in FIG. 34, a schedule registration processing in FIG. 35, a schedule notification processing in FIG. 36, and an advance notification processing in FIG. 37.

Figure 32:
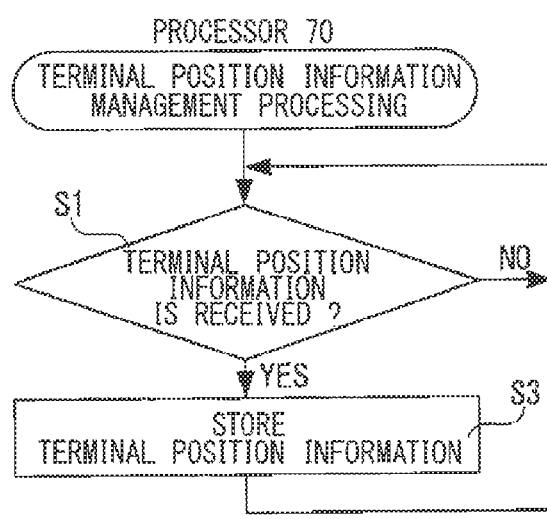
FIG. 32 illustrates a flowchart showing an example of a terminal position information management processing performed by a processor of the mobile phone.

FIG. 32 illustrates a flowchart showing the terminal position information management processing. For example, the terminal position information management processing is started when the power of the mobile phone 10 is turned on. In Step S1, the processor 70 determines whether the terminal position information is received. That is, the processor 70 determines whether the mobile phone 10 receives the terminal position information including the terminal position, the posture, and the azimuth from the wearable terminal 12. If "NO" in Step S1, or equivalently, if the terminal position information is not received from the wearable terminal 12, the processor 70 executes the processing in Step S1 again.

If "YES" in Step S1, or equivalently, if the terminal position information is received from the wearable terminal 12, the processor 70 stores the terminal position information in Step S3. That is, the received terminal position information is stored in the terminal position information buffer 332. When the processing in Step S3 is completed, the processor 70 returns to the processing in Step S1. That is, the processor 70 determines again whether the terminal position information is received. The terminal position information management processing is repeated at predetermined intervals (of, for example, five seconds).

The terminal position information management processing according to another embodiment may include the step of setting a warning mode, in which a warning sound is output after a lapse of time over which terminal position information cannot be received. If the terminal position information from the wearable terminal 12 cannot be received, the child is likely to be exposed to danger, and the parent is notified of this situation.

Figure 33:
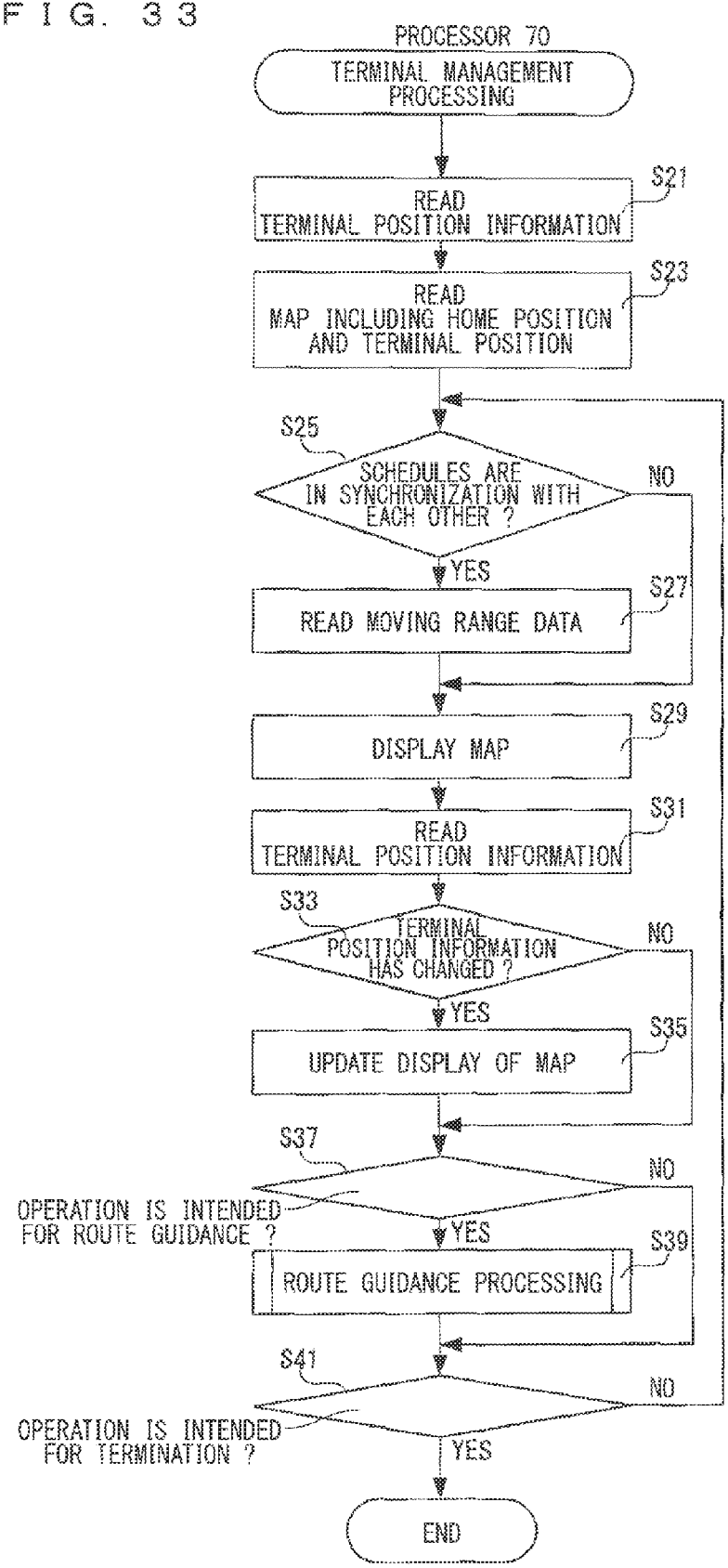
FIG. 33 illustrates a flowchart showing an example of a terminal management processing performed by the processor of the mobile phone.

FIG. 33 illustrates a flowchart showing the terminal management processing. For example, when the management function is performed, the processor 70 reads the terminal position information in Step S21. That is, the terminal position information of the wearable terminal 12 is read from the terminal position information buffer 332. Subsequently, in Step S23, the processor 70 reads a map including the home position and the terminal position. That is, the map data 338 is read on the basis of the home position data 340 and the terminal position included in the terminal position information that has been read.

Then, in Step S25, the processor 70 determines whether schedules are in synchronization with each other. That is, a determination is made whether the schedule information is stored in the schedule information buffer 336. If "YES" in Step S25, or equivalently, if the schedules are in synchronization with each other, the processor 70 reads the moving range data 342 in Step S27 and causes the display 24 to display a map in Step S29. For example, as illustrated in FIG. 28, the display 24 displays a map including the first moving range A1, the second moving range A2, the third moving range A3, the terminal position icon C, and the home position icon H. If "NO" in Step S25, or equivalently, if the schedules are not in synchronization with each other, the processor 70 causes, in Step S29, a map including the terminal position icon C and the home position icon H to be displayed as illustrated in FIG. 16.

Subsequently, in Step S31, the processor 70 reads the terminal position information. That is, the terminal position information is read from the terminal position information buffer 332 again. Then, in Step S33, the processor 70 determines whether the terminal position information has changed. For example, a determination is made whether the position of the child has changed. If "NO" in Step S33, or equivalently, if the position of the child has not changed, the processor 70 proceeds to the processing in Step S37. If "YES" in Step S33, or equivalently, if the position of the child has changed, the processor 70 updates the display of the map in Step S35. For example, the display of the terminal position icon C on the map is updated.

Subsequently, in Step S37, the processor 70 determines whether the operation is intended for the route guidance. For example, a determination is made whether a tap is performed on the terminal position icon C. If "YES" in Step S37, or equivalently, if a tap is performed on the terminal position icon C, the processor 70 executes the route guidance processing in Step S39. Upon completion of the processing in Step S39, the processor 70 proceeds to the processing in Step S41. The route guidance processing will be described in detail with reference to the flowchart in FIG. 34, and thus the detailed description thereof is not given here for brevity.

If "NO" in Step S37, or equivalently, if a tap is not performed on the terminal position icon C, the processor 70 determines whether the operation is intended for termination in Step S41. For example, a determination is made whether the operation of terminating the management function is performed. If "NO" in Step S41, or equivalently, if the operation of terminating the management function is not performed, the processor 70 returns to the processing in Step S25. If "YES" in Step S41, or equivalently, if the operation of terminating the management function is performed, the processor 70 terminates the terminal management processing.

Figure 34:
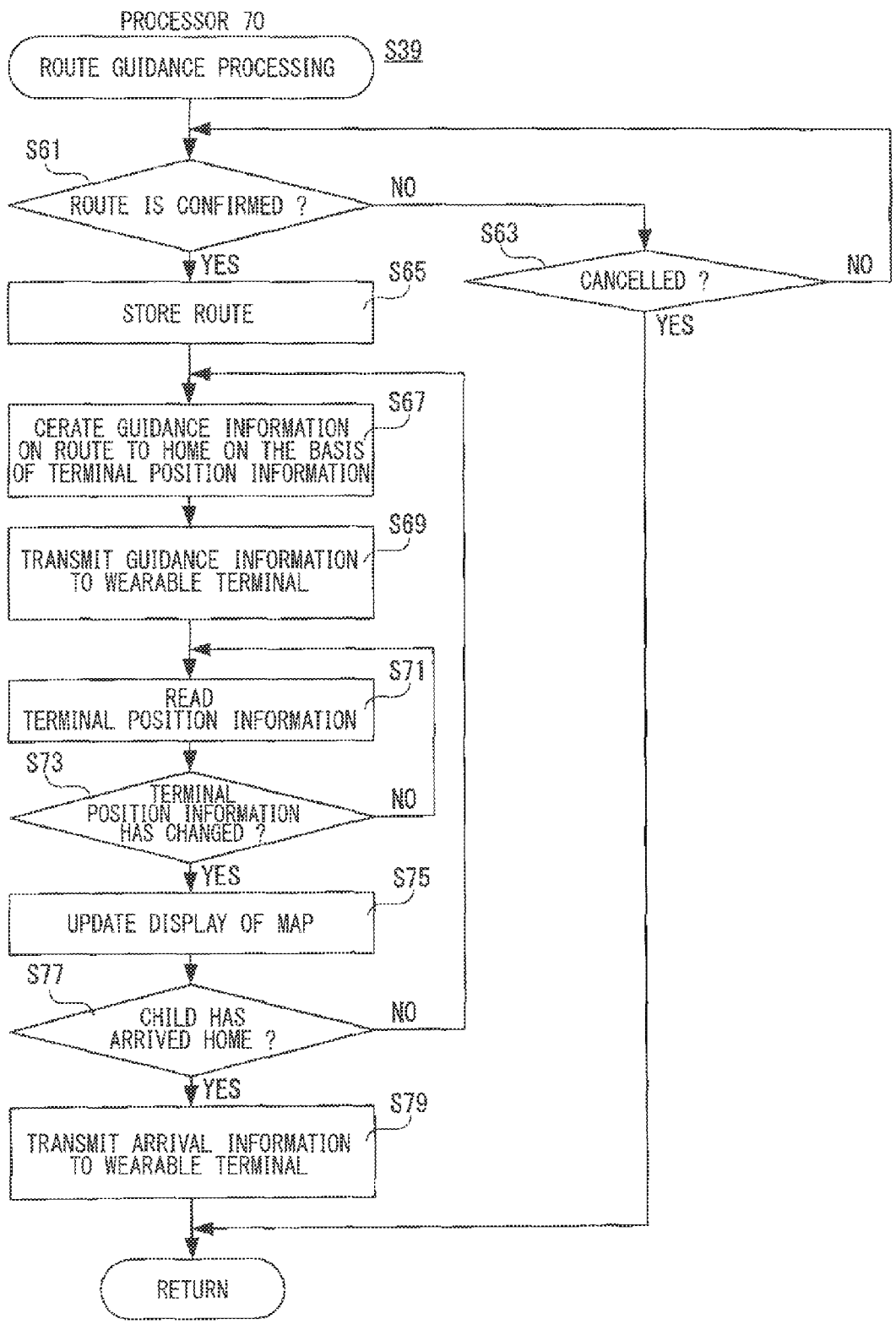
FIG. 34 illustrates a flowchart showing an example of a route guidance processing performed by the processor of the mobile phone.

FIG. 34 illustrates a flowchart showing the route guidance processing. When the processing in Step S39 is executed in the terminal management processing, the route guidance processing is started. In Step S61, the processor 70 determines whether the route is confirmed. For example, a determination is made whether a tap is performed on the home position icon H after the slide operation of inputting a route is performed as illustrated in FIGS. 17 to 20. If "NO" in Step S61, or equivalently, if the route is not confirmed, the processor 70 determines, in Step S63, whether the route is cancelled. For example, a determination is made whether no operation has been performed. If "YES" in Step S63, or equivalently, if no operation has been performed, the processor 70 terminates the route guidance processing and returns to the terminal management processing. If "NO" in Step S63, or equivalently, if a touch operation is performed, the processor 70 returns to the processing in Step S61.

If "YES" in Step S61, or equivalently, if a route is input and then a tap is performed on the home position icon H, the processor 70 stores a route in Step S65. If the input of the route is confirmed as illustrated in FIG. 20, the route is stored in the route buffer 334. When the route is stored, the display 24 displays the pop-up P notifying that the input route is confirmed.

Subsequently, in Step S67, the processor 70 creates guidance information on a route to home on the basis of the terminal position information. For example, the processor 70 computes the position on the route with reference to the terminal position included in the terminal position information and the route stored in the route buffer 334, and computes the right direction on the route on the basis of the posture and the azimuth included in the terminal position information. Then, the guidance information is created on the basis of the position and the right direction on the route that have been computed in such a manner. The processor 70 executing the processing in Step S67 functions as a creator. Subsequently, in Step S69, the processor 70 transmits the guidance information to the wearable terminal 12.

Subsequently, in Step S71, the processor 70 reads the terminal position information. Then, in Step S73, the processor 70 determines whether the terminal position information has changed. For example, a determination is made whether the position of the child has changed. If "NO" in Step S73, or equivalently, if the position of the child has not changed, the processor 70 returns to the processing in Step S71. If "YES" in Step S73, or equivalently, if the position of the child has changed, the processor 70 updates the display of the map in Step S75. For example, the display of the terminal position icon C is updated.

Subsequently, in Step S77, the processor 70 determines whether the child has arrived home. That is, a determination is made whether the terminal position is in close agreement with the home position. In particular, a determination is made whether the child has arrived home on the basis of the home position data 340 and the terminal position included in the terminal position information. If "NO" in Step S77, or equivalently, if the child has not arrived home, the processor 70 returns to the processing in Step S67.

If "YES" in Step S77, or equivalently, if the child has arrived home, the processor 70 transmits the arrival information to the wearable terminal 12 in Step S79. That is, the arrival information notifying that the child has arrived home is transmitted. Upon completion of the processing in Step S79, the processor 70 ends the route guidance processing and returns to the terminal management processing. In another embodiment, the display 24 of the mobile phone 10 may display the pop-up P providing a notification of the child's arrival in step with the transmission of the arrival information.

Figure 35:
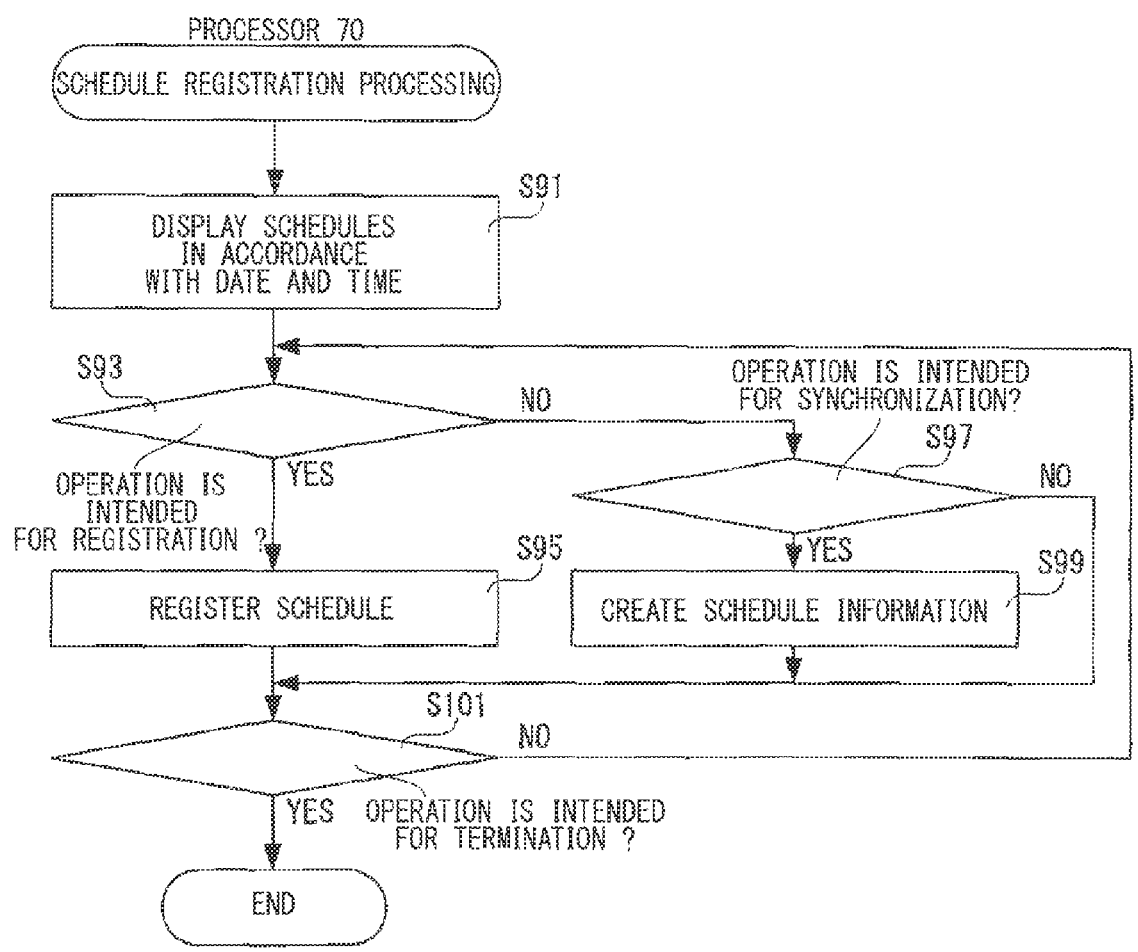
FIG. 35 illustrates a flowchart showing an example of a schedule registration processing performed by the processor of the mobile phone.

FIG. 35 is a flowchart showing the schedule registration processing. For example, in response to an operation of performing the scheduling function, the processor 70 displays schedules in accordance with the date and time in Step S91. That is, the schedule data 344 is read in accordance with the date-and-time information output by the RTC 70a, and then the display 24 displays the schedules for the date corresponding to the date-and-time information that has been read (the schedules for the relevant day).

Subsequently, in Step S93, the processor 70 determines whether the operation is intended for the registration. That is, a determination is made whether an operation of registering a new schedule is performed. If "YES" is Step S93, or equivalently, if an operation of registering a new schedule is performed, the processor 70 registers the schedule in Step S95. That is, the details of the input schedule are added to the schedule data 344. Upon completion of the processing in Step S95, the processor 70 proceeds to the processing in Step S101.

If "NO" in Step S93, or equivalently, if an operation of registering a schedule is not performed, the processor 70 determines whether the operation is intended for synchronization in Step S97. For example, a determination is made whether an operation of synchronizing schedules is performed on a schedule of the parent, as illustrated in FIGS. 25 and 26. If "NO" in Step S97, or equivalently, if the operation of synchronizing schedules is not performed, the processor 70 proceeds to the processing in Step S101. If "YES" in Step S97, or equivalently, if the operation of synchronizing schedules is performed, the processor 70 creates schedule information in Step S99. That is, the schedule information for indicating the details of the schedule on the wearable terminal 12 is created on the basis of the synchronized schedule of the parent. The created schedule information is stored in the schedule information buffer 336.

Subsequently, in Step S101, the processor 70 determines whether the operation is intended for termination. For example, a determination is made whether an operation of terminating the scheduling function is performed. If "NO" in Step S101, or equivalently, if the operation of terminating the scheduling function is not performed, the processor 70 returns to the processing in Step S93. If "YES" in Step S101, or equivalently, if the operation of terminating the scheduling function is performed, the processor 70 terminates the scheduling function.

Figure 36:
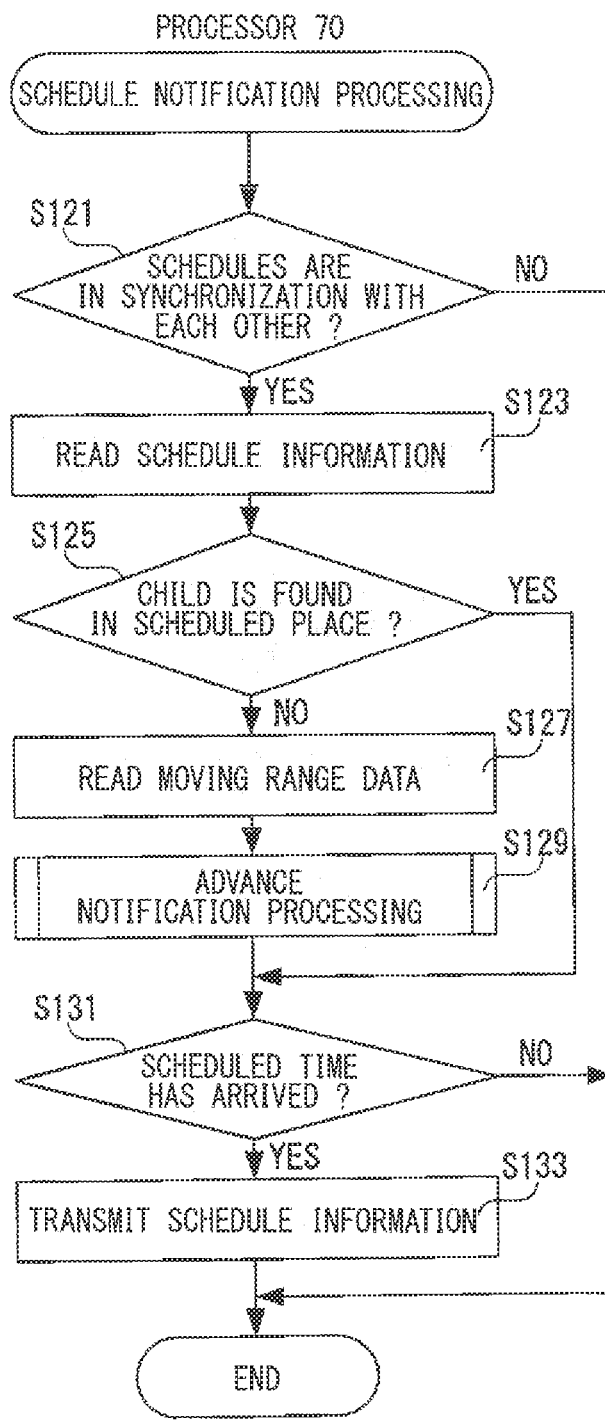
FIG. 36 illustrates a flowchart showing an example of a schedule notification processing according to a first embodiment performed by the processor of the mobile phone.

FIG. 36 is a flowchart showing the schedule notification processing. For example, when the power of the mobile phone 10 is turned on and a command to execute the schedule notification processing is issued, the schedule notification processing is executed. The command to execute the schedule notification processing is issued at fixed intervals (of, for example, 60 seconds).

When the schedule notification processing is executed, the processor 70 determines, in Step S121, whether schedules are in synchronization with each other. That is, a determination is made whether the schedule information is stored in the schedule information buffer 336. If "NO" in Step S121, or equivalently, if the schedules are not in synchronization with each other, the processor 70 ends the schedule notification processing. If "YES" in Step S121, or equivalently, if the schedules are in synchronization with each other, the processor 70 reads the schedule information in Step S123. That is, the schedule information corresponding to the schedules in synchronization with each other is read from the schedule information buffer 336.

Subsequently, in Step S125, the processor 70 determines whether the child is found in the scheduled place. For example, a determination is made whether the child is at "home." In particular, a determination is made whether the child is at home on the basis of the home position data 340 and the terminal position included in the terminal position information. If "YES" in Step S125, or equivalently, if the child is at home, the processor 70 proceeds to the processing in Step S131. If "NO" in Step S125, or equivalently, if the child is away from home, the processor 70 reads the moving range data 342 in Step S127. For example, the data on the first moving range A1, the second moving range A2, and the third moving range A3 illustrated in FIG. 28 is read. Subsequently, in Step S129, the processor 70 executes the advance notification processing in Step S129. The advance notification processing will be described with reference to the flowchart in FIG. 37, and thus the detailed description thereof is not given here for brevity.

Subsequently, in Step S131, the processor 70 determines whether the scheduled time has arrived. That is, on the basis of the scheduled time included in the read schedule information and the date-and-time information read from the RTC 70a, a determination is made whether the scheduled time associated with the synchronized schedule has arrived. If "NO" in Step S131, or equivalently, if the scheduled time has not arrived yet, the processor 70 ends the schedule notification processing. If "YES" in Step S131, or equivalently, if the scheduled time has arrived, the processor 70 transmits the schedule information in Step S133. That is, the schedule information stored in the schedule information buffer 336 is transmitted to the wearable terminal 12. Upon completion of the processing in Step S133, the processor 70 ends the schedule notification processing.

Figure 37:
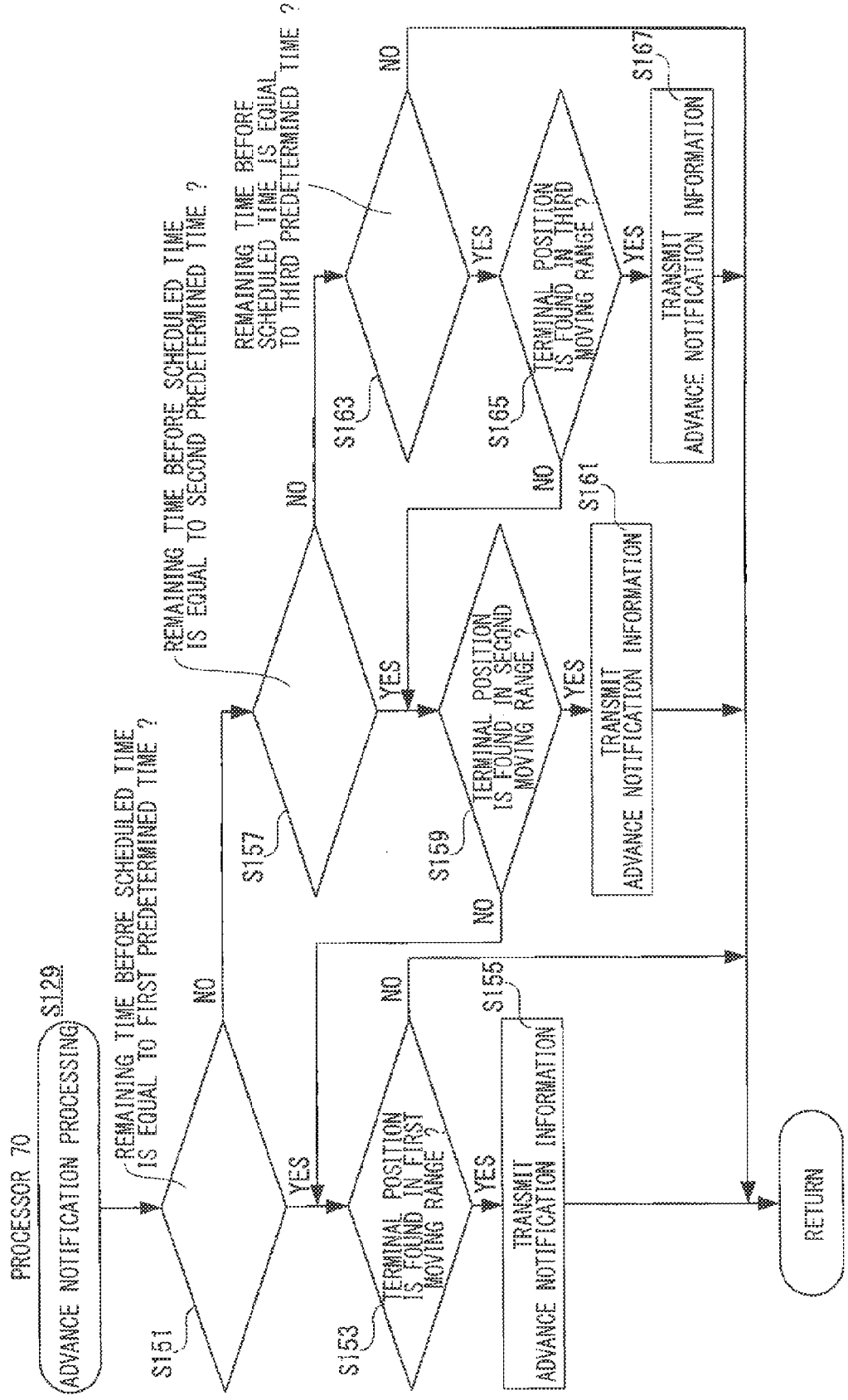
FIG. 37 illustrates a flowchart showing an example of an advance notification processing performed by the processor of the mobile phone.

FIG. 37 illustrates a flowchart showing the advance notification processing. When the processing in S129 is performed in the advance notification processing, the processor 70 determines, in Step S151, whether the remaining time before the scheduled time is equal to the first predetermined time. That is, a determination is made whether the remaining time before the scheduled time becomes equal to the first predetermined time on the basis of the scheduled time included in the schedule information and the date-and-time information read from the RTC 70a. If "YES" in Step S151, or equivalently, if the remaining time before the scheduled time is equal to the first predetermined time, the processor 70 determines, in Step S153, whether the terminal position icon C is found in the first moving range A1. In a case where "home" is set as the scheduled place, a determination is made whether the child is found in an area from which the child can come home within the first predetermined time. If "YES" in Step S153, or equivalently, if the terminal position is found in the first moving range A1 as illustrated in FIG. 28, the processor 70 transmits advance notification information to the wearable terminal 12 in Step S155. To be more specific, as illustrated in FIG. 28, the advance notification information including the current time and the details of the schedule, for example, is transmitted to the wearable terminal 12. If "NO" in Step S153, or equivalently, if the terminal position is not found in the first moving range A1, the processor 70 ends the advance notification processing and returns to the schedule notification processing.

If "NO" in Step S151, or equivalently, if the remaining time before the scheduled time is not equal to the first predetermined time, the processor 70 determines, in Step S157, whether the remaining time before the scheduled time is equal to the second predetermined time. If "YES" in Step S157, or equivalently, if the remaining time before the scheduled time is equal to the second predetermined time, the processor 70 determines, in Step S159, whether the terminal position is found in the second moving range A2. In a case where "home" is set as the scheduled place, a determination is made whether the child is found in an area from which the child can come home within the second predetermined time. If "YES" in Step S159, or equivalently, if the terminal position icon C is found in the second moving range A2 as illustrated in FIG. 29, the processor 70 transmits advance notification information in Step S161. To be more specific, as illustrated in FIG. 29, the advance notification information including the details of the schedule is transmitted to the wearable terminal 12. Upon completion of the processing in Step S161, the processor 70 ends the advance notification processing and returns to the schedule notification processing. If "NO" in Step S159, or equivalently, if the child is not found in the second moving range A2, the processor 70 returns to the processing in Step S153. This means that the child is likely to be found in the first moving range A1 when the remaining time before the scheduled time is equal to the second predetermined time, and thus the processing in Step S153 is executed again.

If "NO" in Step S157, or equivalently, if the remaining time before the scheduled time is not equal to the second predetermined time, the processor 70 determines, in Step S163, whether the remaining time before the scheduled time is equal to the third predetermined time. If "NO" in Step S163, or equivalently, if the remaining time before the scheduled time is not equal to the third predetermined time, the processor 70 ends the advance notification processing and returns to the schedule notification processing. If "YES" in Step S163, or equivalently, if the remaining time before the scheduled time is equal to the third predetermined time, the processor 70 determines, in Step S165, whether the terminal position is found in the third moving range A3. That is, a determination is made whether the child is found in the third moving range A3. If "NO" in Step S165, or equivalently, if the child is not found in the third moving range A3, the processor 70 returns to the processing in Step S159. This means that the child is likely to be found in the second moving range A2 or the first moving range A1 when the remaining time before the scheduled time is equal to the third predetermined time, and thus, the processing in Step S159 is executed again. If "YES" in Step S165, or equivalently, if the child is found in the third moving range A3, the processor 70 transmits advance notification information in Step S167. That is, the advance notification information including the current time and the details of the schedules is transmitted to the wearable terminal 12. Upon completion of the processing in Step S167, the processor 70 ends the advance notification processing and returns to the schedule notification processing.

The processor 70 executing the processing in Steps S151, S153, S157, S159, S163, and S165 functions as a determiner.

The processor 110 of the wearable terminal 12 performs a plurality of tasks in parallel under control by a predetermined OS, namely, an OS based on Linux® such as Android® or iOS®. The plurality of tasks include a terminal position information transmission processing in FIG. 38 and a notification processing in FIG. 39.

Figure 38:
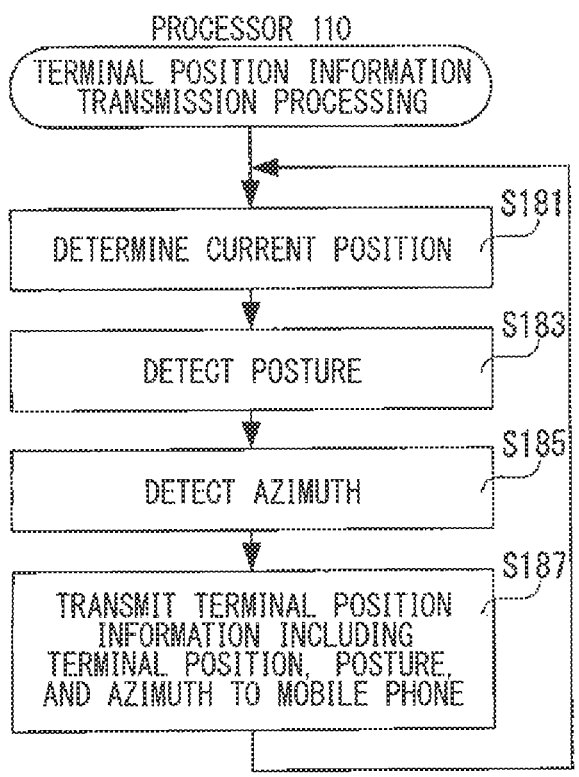
FIG. 38 illustrates a flowchart showing an example of a terminal position information transmission processing performed by a processor of the wearable terminal.

FIG. 38 illustrates a flowchart showing the terminal position information transmission processing. For example, the terminal position information transmission processing is executed when the power of the wearable terminal 12 is turned on. In Step S181, the processor 110 determines the current position. That is, the current position of the wearable terminal 12 is determined through the use of GPS signals from GPS satellites. Subsequently, in Step S183, the processor 110 detects the posture. That is, the posture of the wearable terminal 12 is detected on the basis of the output from the posture sensor 134. Then, in Step S185, the processor 110 detects the azimuth. That is, the azimuth of the wearable terminal 12 (the orientation of the child) is detected on the basis of the output from the azimuth sensor 132. The terminal position, the posture, and the azimuth are stored in the terminal position information buffer 430.

Subsequently, in Step S187, the processor 110 transmits the terminal position information including the terminal position, the posture, and the azimuth to the mobile phone 10. That is, the processor 110 creates the terminal position information including the terminal position, the posture, and the azimuth stored in the terminal position information buffer 430, and transmits the terminal position information to the mobile phone 10. Upon completion of the processing in Step S187, the processor 110 returns to the processing in Step S181. The terminal position information transmission processing is repeated at predetermined intervals equal to the predetermined intervals at which the terminal position information management processing is repeated.

Figure 39:
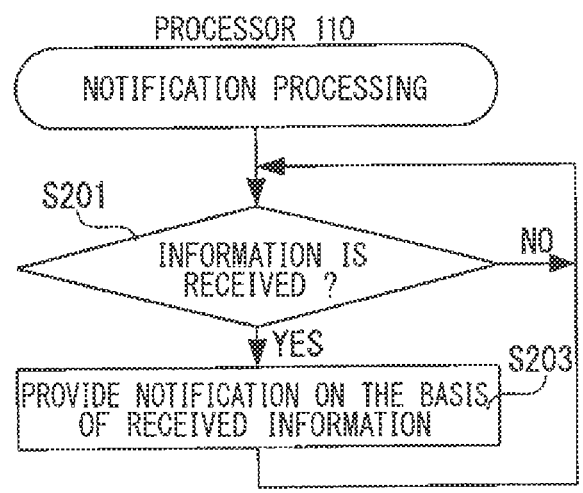
FIG. 39 illustrates a flowchart showing an example of a notification processing performed by the processor of the wearable terminal.

FIG. 39 illustrates a flowchart showing the notification processing. For example, the notification processing is executed when the power of the wearable terminal 12 is turned on. In Step S201, the processor 110 determines whether the information is received. That is, a determination is made whether information received from the mobile phone 10, such as the guidance information, the schedule information, or the advance notification information, is stored in the communication buffer 432. If "NO" in Step S201, or equivalently, if the above-mentioned information is not received, the processor 110 executes the processing in Step S201 again. If "YES" in Step S201, or equivalently, if at least one piece of the above-mentioned information is received, the processor 110 provides notification in Step S203 on the basis of the received information. For example, if the advance notification information is received, the display 42 of the wearable terminal 12 displays the message that the advance notification of schedule is provided as illustrated in FIG. 28. The processor 110 causes the display 42 to display the information, and causes the wearable terminal 12 to vibrate by activating the vibrator 136. Upon completion of the processing in Step S203, the processor 110 returns to the processing in Step S201.

The processor 70 executing the processing in Step S69 and the processor 110 executing the processing in Step S023 each function as a guidance provider. The processor 70 executing the processing in Steps S155, S161, and S167 and the processor 110 executing the processing in Step S203 each function as an advance notification provider. In particular, the processor 70 executing the processing in Steps S155, S161, and S167 functions as a transmitter.

In the first embodiment, a notification of warning information may be provided on the wearable terminal 12 if the child goes beyond the moving ranges A, and thus the child can be advised to come back into the moving ranges A. If this is the case, the child is permitted to perform activities only within the moving ranges A. To avoid such a situation, the advance notification may be provided without the use of the moving ranges A in a second embodiment, which will be described below.

<Second Embodiment>

In the second embodiment, a guidance route from the current position of the child (the terminal position) to the scheduled place (the home position) is set, and an advance notification of the synchronized schedule is provided in accordance with the route. The route guidance system according to the second embodiment is substantially the same as the route guidance system 100 in the first embodiment. Thus, for simplicity, the configuration of the system as well as the mobile phone 10 and the wearable terminals 12 included in the system will not be described below in detail.

For example, a route from the terminal position icon C to the home position icon H is set at fixed intervals (of, for example, 60 seconds), and the departure time for the case where the scheduled time is set as the arrival time for the travel on the route is calculated. When the departure time agrees with the current time, the advance notification of schedule is provided on the wearable terminal 12. Thus, the advance notification of schedule can be provided without regard to the moving ranges A. Since the route is set in accordance with the current position of the child and the advance notification is provided in accordance with the route, the advance notification can be provided at an appropriate timing.

Subsequent to the advance notification, route guidance is provided in accordance with the set route in the second embodiment. This can urge the child to ensure greater adherence to the schedule. The specific actions in the route guidance are substantially the same as the actions in the first embodiment. Thus, for simplicity, the specific actions will not be described below in detail.

Although the shortest route is set in the second embodiment, a safe route may be set in another embodiment. The safe route refers to a route that does not include areas or roads set as dangerous areas or dangerous roads by, for example, the parent in advance and follows, as much as possible, a recommended street which is kept lighted by the streetlight or the like in the nighttime. The brightness of a street varies depending on sunrise and sunset times, and thus the recommended street changes according to season. In another embodiment, sunrise and sunset times for the day are acquired in accordance with the date-and-time information, and a safe route including a recommended street determined on the basis of the read times may be set accordingly.

The above description has provided an overview of the features of the second embodiment. The second embodiment will be described below with reference to the flowchart in FIG. 40.

Figure 40:
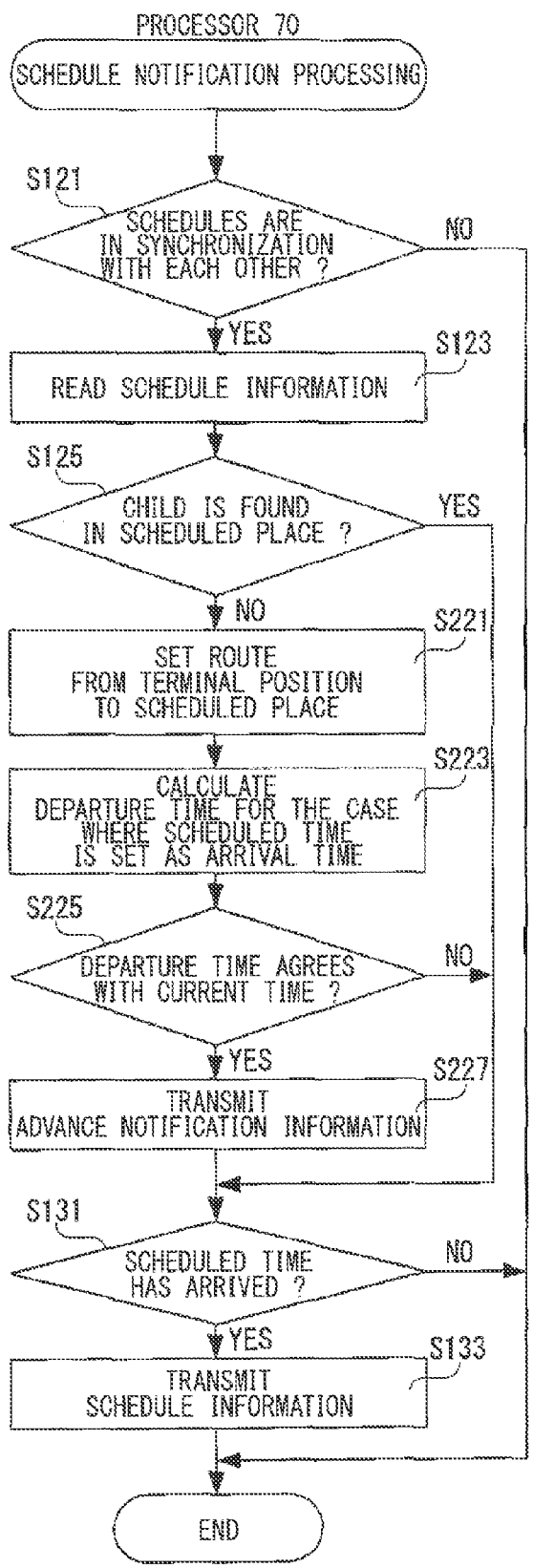
FIG. 40 illustrates a flowchart showing an example of the schedule notification processing according to a second embodiment performed by the processor of the mobile phone.

FIG. 40 is a flowchart showing the schedule notification processing according to the second embodiment. The detailed description of the steps in which the schedule notification processing of the second embodiment overlaps that of the first embodiment will not be given here for brevity.

When the schedule notification processing according to the second embodiment is executed, the processor 70 determines, in Step S121, whether schedules are in synchronization with each other. If "NO" in Step S121, the processor 70 ends the schedule notification processing. If "YES" in Step S121, or equivalently, if the schedules are in synchronization with each other, the processor 70 reads schedule information in Step S123. Subsequently, in Step S125, the processor 70 determines whether the child is found in the scheduled place. If "YES" in Step S125, the processor 70 proceeds to the processing in Step S131.

If "NO" in Step S125, or equivalently, if the child is not at home, the processor 70 sets a route from the terminal position to the scheduled place in Step S221. For example, a route from the terminal position to the home position is set. Subsequently, in Step S223, the processor 70 calculates the departure time for the case where the scheduled time is set as the arrival time. That is, the departure time for the case where the scheduled time is set as the arrival time for the travel on the set route is calculated. Then, in Step S225, the processor 70 determines whether the departure time agrees with the current time. That is, a determination is made whether there is a necessity to leave in order to adhere to the schedule. If "NO" in Step S225, or equivalently, if the departure time does not agree with the current time, the processor 70 proceeds to the processing in Step S131. If "YES" in Step S225, or equivalently, if the departure time agrees with the current time, the processor 70 transmits advance notification information in Step S227. For example, the display 42 of the wearable terminal 12 displays a message indicating the current time and the details of the schedule.

The processor 70 executing the processing in Step S221 functions as a setting provider. The processor 70 executing the processing in Step S223 functions as a calculator. The processor 70 executing the processing in Step S225 functions as a determiner. The processor 70 executing the processing in Step S227 functions as a transmitter.

Subsequently, in Step S131, the processor 70 determines whether the scheduled time has arrived. If "NO" in Step S131, the processor 70 ends the schedule notification processing. If "YES" in Step S131, or equivalently, if the scheduled time has arrived, the processor 70 transmits the schedule information in Step S133. Upon completion of the processing in Step S133, the processor 70 ends the schedule notification processing.

If the schedule notification processing is ended in the state where the route is set, the route guidance processing is executed. While the route guidance is provided in accordance with the route set in the schedule notification processing, the schedule notification processing may not be executed.

The processor 70 executing the processing in Step S227 and the processor 110 executing the processing in Step S203 each function as an advance notification provider.

In another embodiment, switching between a mode set in accordance with the first embodiment and a mode set in accordance with the second embodiment may be performed by the user at any time.

In still another embodiment, the schedule information may be transmitted to the wearable terminal 12 in response to synchronization of schedules. In this configuration, the wearable terminal 12 provides a notification of the schedule information in response to the arrival of the scheduled time. In a case where wearable terminal 12 includes map data, the wearable terminal 12 may be configured to provide the advance notification on the basis of the received schedule information.

The guidance information is created in the mobile phone 10, and the route guidance based on the guidance information is provided on the wearable terminal 12. Thus, the performance of the wearable terminal 12 can be minimized, and the price of the wearable terminal 12 can be minimized accordingly. In another embodiment, the route guidance may be provided as follows: the wearable terminal 12 stores the map data; an input route is transmitted to the wearable terminal 12; and the wearable terminal 12 creates the guidance information. This configuration can lighten the workload of the mobile phone 10, and can reduce the communication traffic accordingly.

In one embodiment, the home information is registered through the use of GPS signals. In another embodiment, the home position may be set by the parent designating the home position on the displayed map.

In a case where the child strays from the route, guidance information for bringing the child back to the route is created and the guidance information is provided on the wearable terminal 12.

In still another embodiment, it is not required that a map be displayed on the mobile phone 10 during the route guidance. In this case, a notification action is performed through the use of sound and light at the occurrence of an event, such as the child's arrival at home.

In still another embodiment, it is not required that the home be set as the destination in the route guidance. Alternatively, the current position of the mobile phone 10 may be set as the destination, or another place may be set as the destination when a route is input.

In still another embodiment, similarly to the display of the mobile phone 10, the display 42 of the wearable terminal 12 may display a map while the route guidance is provided on the wearable terminal 12.

In still another embodiment, during the route guidance, the wearable terminal 12 may provide instructions to walk with the eyes kept to the front. With an acceleration sensor being included in the wearable terminal 12, in a case where the posture sensor 134 detects the posture in which the wearable terminal 12 is checked and the acceleration sensor detects shifts in the position of the wearable terminal 12, the route guidance may be temporarily halted and a message instructing the child to stop may be displayed. If this is the case, the route guidance is resumed when no shift in the position of the wearable terminal 12 is detected.

In still another embodiment, in response to a determination that the child is not at home, an advance notification of schedule may be provided, regardless of the current position of the child, when the remaining time before the scheduled time becomes equal to a predetermined time.

In still another embodiment, schedules of the parent may be synchronized with the schedules on the individual wearable terminals 12 carried by a plurality of children.

In still another embodiment, without necessitating the biosensor 52, a determination may be made whether the wearable terminal 12 is taken off. For example, a magnetic sensor is embedded in the first belt 48*a* and a magnet is embedded in the second belt 48*b*. This configuration allows the magnetic sensor to detect the magnetism of the magnet when the wearable terminal 12 has the fitted shape. In this configuration, the magnetic sensor cannot detect the magnetism of the magnet if the wearable terminal 12 does not have the fitted shape. This means that the magnetic sensor fails to detect the magnetism of the magnet when the wearable terminal 12 is taken off, and thus the processor 110 can determine that the wearable terminal 12 is taken off.

In still another embodiment, a mechanical switch, instead of the magnetic sensor or the magnet, may be embedded in the base portion of the individual belt 48 such that the removal of the wearable terminal 12 can be determined. For example, the mechanical switch embedded in the base portion of the individual belt 48 is turned off if the wearable terminal 12 has the fitted shape and the mechanical switch is turned on if the wearable terminal 12 does not have the fitted shape. Thus, the processor 110 can determine whether the wearable terminal 12 is taken off on the basis of the on-off actions of the mechanical switches.

In addition to GPS signals transmitted from the GPS satellites, signals transmitted from the base station may be used to determine the current position in still another embodiment. Alternatively, signals transmitted from wireless LAN access points may be used in place of GPS signals.

The programs implemented in one embodiment may be stored in a hard disk drive (HDD) of a data distribution server and may be distributed to the mobile phone 10 and the wearable terminals 12 through the network. Non-transitory computer readable recording media including optical disks such as compact discs (CDs), DVDs, Blue-Ray Disks (BDs), USB memories, and memory cards may be sold or distributed, with a plurality of programs being stored in the recording media. The effects equal to those of one embodiment may be produced if the programs downloaded through the server or the recording media mentioned above are installed on mobile phones and wearable terminals having the configurations equivalent to the configurations of the mobile phone and the wearable terminal in one embodiment.

The specific numerical values mentioned herein are provided as merely an example, and therefore, may be appropriately changed in accordance with, for example, changes in product specifications.

While the route guidance system 100 has been described above in detail, the above description is in all aspects illustrative and not restrictive. In addition, various modifications described above are applicable in combination as long as they are not mutually inconsistent. It is understood that numerous modifications which have not been exemplified can be devised without departing from the scope of the present disclosure.

The invention claimed is:

1. An advance notification system comprising:
  a first mobile device comprising a transmitter, at least one first processor, and a storage that stores a schedule including a scheduled time and a scheduled place, and a plurality of predetermined ranges including a first predetermined range and a second predetermined range located inboard with respect to the first predetermined range, with the center of the plurality of predetermined ranges being set at the scheduled place; and
  a second mobile device that acquires a device position of the second mobile device itself;
  wherein the at least one first processor
    determines whether an advance notification is required on the basis of the device position with respect to the first predetermined range when a remaining time before the scheduled time becomes equal to a predetermined time, and determines whether the advance notification is required on the basis of the device position with respect to the second predetermined range when a fixed amount of time has elapsed since the remaining time before the scheduled time became equal to the predetermined time, and
    cause the transmitter to transmit the advance notification to the second mobile device when determining that the advance notification is required.

2. The advance notification system according to claim 1, wherein the at least one first processor is configured to:
  set a route from the device position to the scheduled place;
  calculate, in accordance with the route, a departure time for a case where the scheduled time is set as an arrival time; and
  determine whether the advance notification is required on the basis of a current time and the departure time.

3. The advance notification system according to claim 2, wherein the at least one first processor is configured to:
  create guidance information on the basis of the device position and the route when the advance notification is transmitted to the second mobile device; and
  cause the transmitter to transmit route guidance to the second mobile device on the basis of the guidance information.

4. The advance notification system according to claim 3, wherein the second mobile device comprises a receiver and at least one second processor, the receiver receives the route guidance from the first mobile device, and the at least one second processor notifies a user of the second mobile device of the route guidance.

5. An advance notification method in an advance notification system including
  a first mobile device that stores a schedule including a scheduled time and a scheduled place, and a plurality of predetermined ranges including a first predetermined range and a second predetermined range located inboard with respect to the first predetermined range, with the center of the plurality of predetermined ranges being set at the scheduled place, and
  a second mobile device that acquires a device position of the second mobile device itself,
the method comprising:
  determining, by a processor of the advance notification system, whether an advance notification is required on the basis of the device position with respect to the first predetermined range when a remaining time before the scheduled time becomes equal to a predetermined time, and determining whether the advance notification is required on the basis of the device position with respect to the second predetermined range when a fixed amount of time has elapsed since the remaining time before the scheduled time becomes equal to the predetermined time; and
  providing the advance notification on the second mobile device when the processor determines that the advance notification is required.

6. A mobile communication device comprising:
  a storage configured to store a schedule including a scheduled time and a scheduled place, and a plurality of predetermined ranges including a first predetermined range and a second predetermined range located inboard with respect to the first predetermined range, with the center of the plurality of predetermined ranges being set at the scheduled place;
  a receiver configured to receive a device position acquired by an another mobile device; and
  at least one processor configured to
    determine whether an advance notification is required on the basis of the device position with respect to the first predetermined range when a remaining time before the scheduled time becomes equal to a predetermined time, and determining whether the advance notification is required on the basis of the device position with respect to the second predetermined range when a fixed amount of time has elapsed since the remaining time before the scheduled time becomes equal to the predetermined time, and
  a transmitter configured to transmit advance notification information to the another mobile device when the at least one processor determines that the advance notification is required.

* * * * *